United States Patent [19]
Banker et al.

[11] Patent Number: 5,477,262
[45] Date of Patent: Dec. 19, 1995

[54] METHOD AND APPARATUS FOR PROVIDING AN ON-SCREEN USER INTERFACE FOR A SUBSCRIPTION TELEVISION TERMINAL

[75] Inventors: Robert O. Banker, Cumming; Kinney C. Bacon, Lawrenceville; Julius B. Bagley, Marietta, all of Ga.

[73] Assignee: Scientific-Altanta, Inc., Norcross, Ga.

[21] Appl. No.: 800,836

[22] Filed: Nov. 29, 1991

[51] Int. Cl.[6] .................................................. H04N 7/10
[52] U.S. Cl. ................................ 348/7; 348/10; 455/4.2
[58] Field of Search ...................... 455/4.2, 6.2; 358/84, 358/86, 194.1; 340/709, 712; 345/168, 172, 160, 173, 158.5; 348/6, 7, 10

[56] References Cited

U.S. PATENT DOCUMENTS

| | | | |
|---|---|---|---|
| 3,636,315 | 1/1972 | Comeau | 340/152 R |
| 4,305,101 | 12/1981 | Yarbrough et al. | 360/69 |
| 4,536,791 | 8/1985 | Campbell et al. | 358/122 |
| 4,623,887 | 11/1986 | Welles, II | 340/825.57 |
| 4,626,892 | 12/1986 | Northrup et al. | 358/188 |
| 4,641,205 | 2/1987 | Beyers, Jr. | 360/33.1 |
| 4,701,794 | 10/1987 | Froling et al. | 358/147 |
| 4,706,121 | 11/1987 | Young | 358/142 |
| 4,718,107 | 1/1988 | Hayes | 455/4 |
| 4,786,895 | 11/1988 | Castaneda | 345/160 |
| 4,821,102 | 4/1989 | Ichikawa et al. | 358/183 |
| 4,825,200 | 4/1989 | Evans et al. | 341/23 |
| 4,825,209 | 4/1989 | Sasaki et al. | 340/825.72 |
| 4,885,775 | 12/1989 | Lucas | 348/10 |
| 4,893,248 | 1/1990 | Pitts et al. | 364/464 |
| 4,896,354 | 1/1990 | Inagaki et al. | 380/7 |
| 4,897,714 | 1/1990 | Ichise et al. | 455/5.1 X |
| 4,907,079 | 3/1990 | Turner et al. | 358/84 |
| 4,914,517 | 4/1990 | Duffield et al. | 358/191.1 |
| 4,930,158 | 5/1990 | Vogel | 380/5 |
| 4,959,719 | 9/1990 | Strubbe et al. | 358/183 |
| 4,959,720 | 9/1990 | Duffield et al. | 358/191.1 |
| 4,963,994 | 10/1990 | Levine | 358/335 |
| 4,977,445 | 12/1990 | Young | 358/142 |
| 4,987,486 | 1/1991 | Johnson et al. | 358/86 |
| 4,991,011 | 2/1991 | Johnson et al. | 358/141 |
| 5,001,554 | 3/1991 | Johnson et al. | 358/86 |
| 5,003,591 | 3/1991 | Kauffman et al. | 380/10 |
| 5,045,947 | 9/1991 | Beery | 358/192.1 |
| 5,046,093 | 9/1991 | Wachob | 380/20 |
| 5,054,071 | 10/1991 | Bacon | 381/12 |
| 5,058,160 | 10/1991 | Banker et al. | 380/20 |
| 5,077,607 | 12/1991 | Johnson et al. | 358/86 |
| 5,179,439 | 1/1993 | Hashimoto | 358/86 |

FOREIGN PATENT DOCUMENTS

| | | |
|---|---|---|
| 0178866A1 | 4/1986 | European Pat. Off. . |
| WO8910664 | 11/1989 | WIPO . |
| WO9007847 | 7/1990 | WIPO . |
| WO9013207 | 11/1990 | WIPO . |
| WO9013100 | 11/1990 | WIPO . |

*Primary Examiner*—Edward F. Urban
*Attorney, Agent, or Firm*—Banner & Allegretti, Ltd.

[57] ABSTRACT

Apparatus for providing a user friendly interface to a subscription television terminal comprises a key pad arranged into a plurality of key groupings and an on-screen display controller for generating a plurality of screens for display on an associated television receiver. Five such key groupings are segregated from one another and comprise function keys, initialization keys, channel keys, audio keys and digit keys. The digit keys may be most conveniently arranged in a two dimensional matrix corresponding to a key pad of a conventional tone dialing telephone. Each of the other key groupings may be arranged linearly and differentiated by the use of color or boxes. A method of initializing the cable television terminal comprises the steps of generating a display of a menu structure, actuating the movement of a cursor in one direction through choices presented by a menu by use of a cursor key, and actuating a selection of a menu choice via actuation of a select key. For example, a sleep timer may be implemented in a subscription television terminal for turning off power to an associated television set after a predetermined period of time. Parental control of received channels can be established such that only those having knowledge of a particular code may view the parentally controlled channel. Other features of a terminal in accorance with the invention include messaging, establishing a favorite channel list, pay-per-view, program timing, and terminal control.

18 Claims, 46 Drawing Sheets

| CHARACTER COLOR BITS | BLINKING BIT | CHARACTER CODE |
|---|---|---|

FIG.3B

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 | 240 |

SCREEN 1a
 TIME, CHANNEL, PID OVERLAY

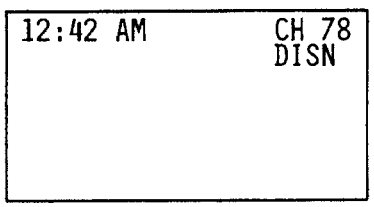

PRESS KEYS:
 FAVORITE, LAST, DISPLAY,
 CH△, CH▽

TIMEOUT 4 SECONDS

SLEEP TIMER OFF

LED SAYS "7 8 "

SCREEN 1b
 TWICE NORMAL FIRST LINE

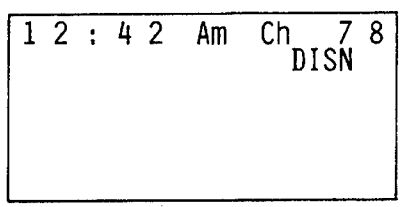

PRESS KEYS:
 FAVORITE, LAST, DISPLAY,
 CH△, CH▽

TIMEOUT 4 SECONDS

SLEEP TIMER OFF

2X DOWNLOADED TO NVM

LED SAYS "7 8 "

SCREEN 1c
 TIME, CHANNEL, PID, SLEEP

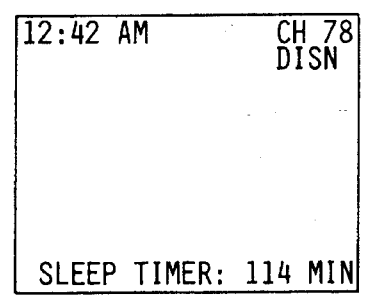

PRESS KEYS:
 FAVORITE, LAST, DISPLAY,
 CH△, CH▽

TIMEOUT 4 SECONDS

SLEEP TIMER ACTIVE AND COUNTING DOWN

LED SAYS "7 8 "

FIG.6A

SCREEN 2a
DIRECT CHAN ACCESS 1ST
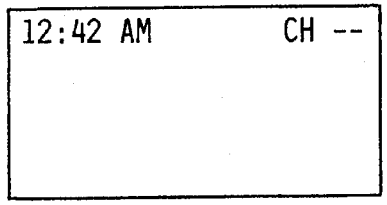
PRESS KEY:
   CHAN
TIMEOUT 4 SECONDS
THE LEFT DASH BLINKS
SCREEN 2b
DIRECT CHAN ACCESS 2ND
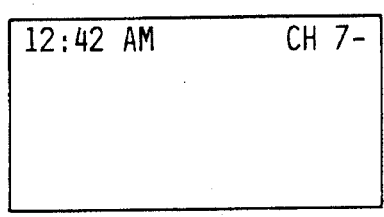
PRESS KEY:
   ANY DIGIT (IF CHAN WAS PRESSED,
   KEYBOARD ENTERS DIGITS)
TIMEOUT 4 SECONDS
THE RIGHT DASH BLINKS
SCREEN 2c
TOP LINE TWICE NORMAL SIZE
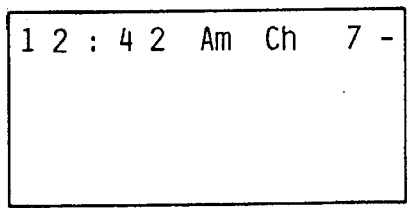
FIG.6B SCREEN 3a
VOLUME CONTROL
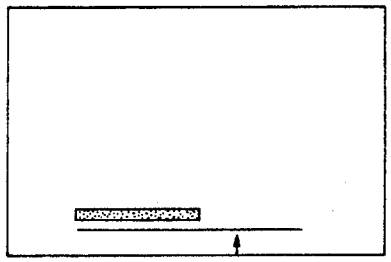
PRESS KEYS:
  VOL , VOL , MUTE
TIMEOUT 3 SECONDS
PRESSING ANY KEY FORCES IMMEDIATE TIMEOUT.
OVERLAY ON TRANSMITTED VIDEO
LED DISPLAY SAYS "3.7 "
SCREEN 3b
OPTIMUM STEREO
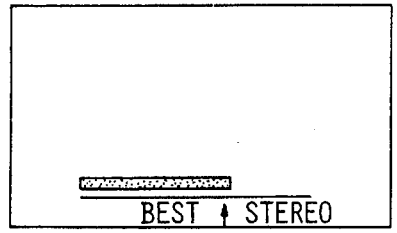
LED DISPLAY SAYS "4.5"
OVERLAY ON TRANSMITTED VIDEO
SCREEN 3c
MUTE
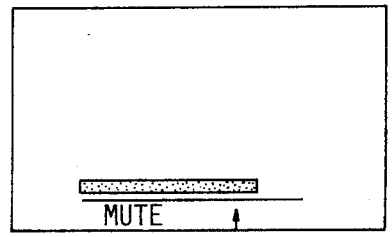
LED DISPLAY SAYS "0.0 "
FIG.6C

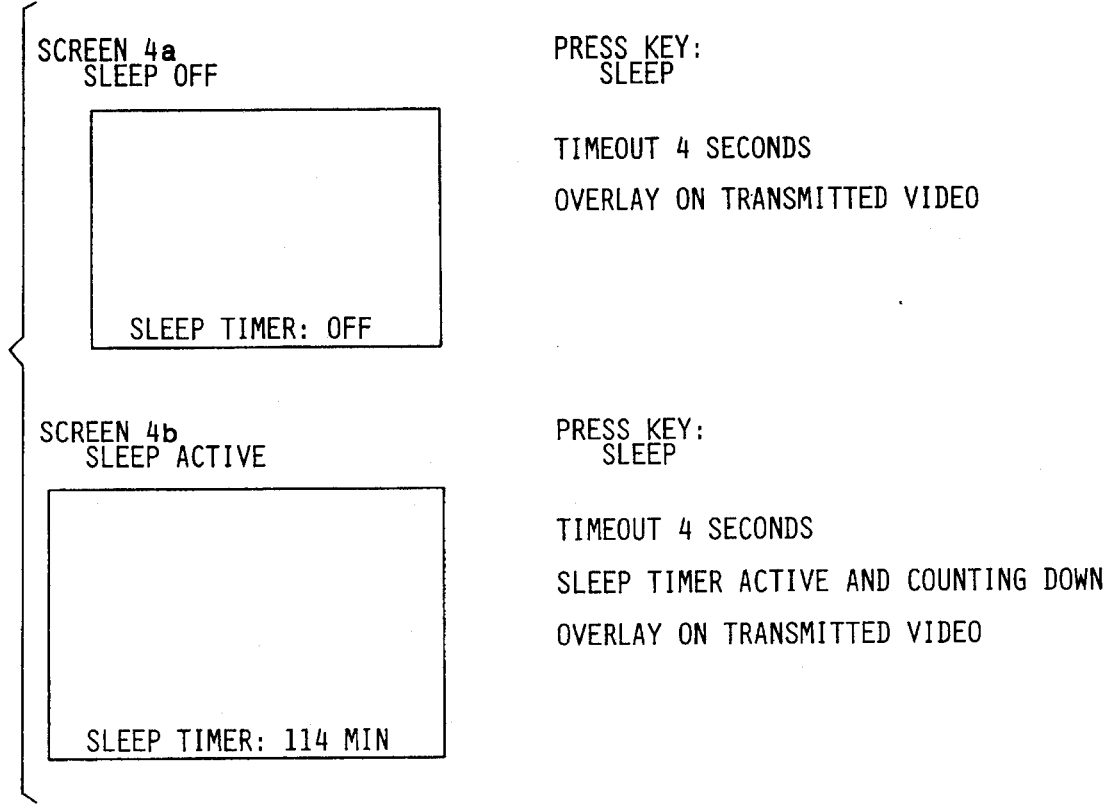

SCREEN 6a
ENTER IPPV ACCESS NUMBER
FIRST NUMBER

```
NEXT, PLEASE ENTER
  YOUR PAY-PER-VIEW
    ACCESS NUMBER

- - - - -
```

SCREEN 6b
ENTER IPPV ACCESS NUMBER
FIFTH NUMBER

```
NEXT, PLEASE ENTER
  YOUR PAY-PER-VIEW
    ACCESS NUMBER

▨ ▨ ▨ ▨ -
```

SCREEN 7a
IPPV BUY

```
   NEXT, PLEASE PRESS
          [BUY]
   TO PURCHASE THIS EVENT

OR

PRESS [MENU] TO EXIT.
```

© SCIENTIFIC-ATLANTA 1991

SCREEN 7b
IPPV THANK YOU

```
       THANK YOU
```

THIS SCREEN REMAINS 4 SECONDS

FIG.6F

© SCIENTIFIC-ATLANTA 1991

SCREEN 8a
  TOP MENU
```
    MESSAGES
    PAY-PER-VIEW
    FAVORITE CHANNELS
    PROGRAM TIMER
    SLEEP TIMER
    PARENTAL CONTROL
 —▷SET-TOP CONTROL
 PUT —▷ON YOUR CHOICE
    THEN PRESS [SELECT].
 PRESS [MENU] TO EXIT.
```

SCREEN 8b
  TOP MENU, NO PC
```
    MESSAGES
    PAY-PER-VIEW
 —▷FAVORITE CHANNELS
    PROGRAM TIMER
    SLEEP TIMER
    SET-TOP CONTROL

PUT —▷ON YOUR CHOICE
    THEN PRESS [SELECT].
 PRESS [MENU] TO EXIT.
```

SCREEN 8c
  TOP MENU, NO TIMER, OR PC
```
 —▷MESSAGES
    PAY-PER-VIEW
    FAVOIRTE CHANNELS
    SLEEP TIMER
    SET-TOP CONTROL

PUT —▷ON YOUR CHOICE
    THEN PRESS [SELECT].
 PRESS [MENU] TO EXIT.
```

SCREEN 8d
  TOP MENU, FOUR ITEMS
```
    MESSAGES
 —▷PAY-PER-VIEW
    SLEEP TIMER
    SET-TOP CONTROL

PLEASE PRESS [SELECT].

PRESS [MENU] TO EXIT.
```

© SCIENTIFIC-ATLANTA 1991

FIG. 7A

SCREEN 14a
　　SET MENU SLEEP TIMER

```
SLEEP TIMER: OFF

PRESS [CH△] OR [CH▽] TO
  CHANGE THE SLEEP TIMER.
PRESS [MENU] TO EXIT.
```

SCREEN 14b
　　SET MENU SLEEP TIMER, NOT TURNED OFF

```
SLEEP TIMER: 120 MIN

PRESS [CH△] OR [CH▽] TO
  CHANGE THE SLEEP TIMER.
PRESS [MENU] TO EXIT.
```

FIG. 9

SCREEN 66a
NO MESSAGES
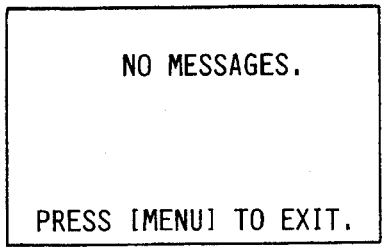
SCREEN 53a
WAIT FOR MESSAGE
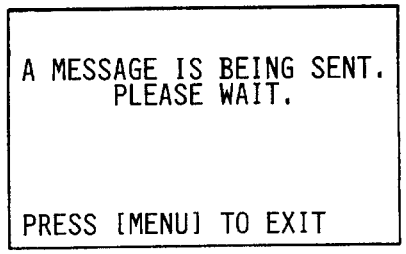
SCREEN 65a
MESSAGE ALERT
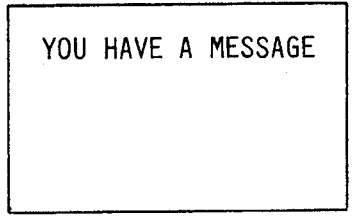
THE MESSAGE ALERT DUTY CYCLE IS
15 SECONDS ON, 15 SECONDS OFF.
SCREEN 54a
A SAMPLE MESSAGE
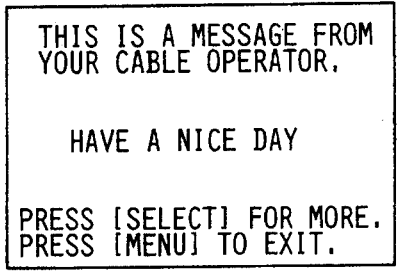
NOTE: THE INSTRUCTIONS ON THIS SCREEN
FOR THE [SELECT] AND [MENU] KEYS
ARE PART OF THE MESSAGE AND NOT
AUTOMATICALLY INSERTED BY THE STT.
FIG. 11

SCREEN 31a
PAY-PER-VIEW MENU

```
       PAY-PER-VIEW
    ▷REVIEW YOUR CURRENTLY
      AUTHORIZED EVENTS
     SET PROGRAM TIMER FOR
        AN EVENT

PUT ▷ ON YOUR CHOICE
      THEN PRESS [SELECT].
    PRESS [MENU] TO EXIT.
```

SCREEN 31b
PAY-PER-VIEW MENU, NO IPPV

```
       PAY-PER-VIEW
    ▷REVIEW YOUR CURRENTLY
      AUTHORIZED EVENTS

PLEASE PRESS [SELECT].

PRESS [MENU] TO EXIT.
```

SCREEN 32a
NO PPV EVENTS PURCHASED.

```
    NO CURRENTLY AUTHORIZED
      PAY-PER-VIEW EVENTS.

PRESS [MENU] TO EXIT.
```

SCREEN 32b
1 OR 2 EVENTS PURCHASED.

```
    CURRENTLY AUTHORIZED
    PAY-PER-VIEW EVENTS:

CHANNEL 27, EVENT 5432
    INDIANA JONES LAST CRUSA
    CHANNEL 14, EVENT 1234
    TYSON-SPINKS

PRESS [MENU] TO EXIT.
```

SCREEN 32c
3 OR MORE EVENTS PURCHASED.

```
    CURRENTLY AUTHORIZED
    PAY-PER-VIEW EVENTS:

CHANNEL 27, EVENT 5432
    INDIANA JONES LAST CRUSA
    CHANNEL 14, EVENT 1234
    TYSON-SPINKS

PRESS [SELECT] FOR MORE.
    PRESS [MENU] TO EXIT.
```

SCREEN 32d
DOWNLOADED DATA NOT RECEIVED YET

```
    CURRENTLY AUTHORIZED
    PAY-PER-VIEW EVENTS:

CHANNEL 27

CHANNEL 14

PRESS [SELECT] FOR MORE.
    PRESS [MENU] TO EXIT.
```

FIG. 13A

SCREEN 33a
IPPV ACCESS NUMBER ENTRY

```
PLEASE ENTER
YOUR PAY-PER-VIEW
ACCESS NUMBER

▨ ▨ ▨ ▨ —
```

SCREEN 34a
IPPV TIMER VCR REMINDER

```
THANK YOU

REMEMBER TO
SET YOUR VCR'S TIMER.
```

SCREEN 35a
PPV ALERT

```
YOU CAN NOW VIEW
THE PAY-PER-VIEW EVENT
ON CHANNEL 29.
```

FIG. 13B

SCREEN 9a
  FAVORITE CHANNELS MENU, SOME EMPTY SLOTS.

```
YOUR FAVORITE CHANNELS
  03   04   05   06   07
  09   10   11   12   13
  18   95   75   --   --
  ADD A CHANNEL
-▷REMOVE A CHANNEL
  CLEAR ALL CHANNELS
PUT -▷ ON YOUR CHOICE
  THEN PRESS [SELECT].
PRESS [MENU] TO EXIT.
```

SCREEN 9b
  FAVORITE CHANNELS MENU, NONE

```
YOUR FAVORITE CHANNELS
  --   --   --   --   --
  --   --   --   --   --
  --   --   --   --   --
-▷ADD A CHANNEL

PLEASE PRESS [SELECT].

PRESS [MENU] TO EXIT.
```

SCREEN 9c
  FAVORITE CHANNELS MENU, FULL

```
YOUR FAVORITE CHANNELS
  03   04   05   06   07
  09   10   11   12   13
  18   95   79   52   42

-▷REMOVE A CHANNEL
  CLEAR ALL CHANNELS
PUT -▷ ON YOUR CHOICE
  THEN PRESS [SELECT].
PRESS [MENU] TO EXIT.
```

FIG. 15A

SCREEN 10a
 ADD THE NEXT FAVORITE CHANNEL

```
ADD A FAVORITE CHANNEL:
 03   04   05   06   07
 12   34   21   05   62
 39   42   --   --   --

PRESS [CH△] OR [CH▽] TO
  CHOOSE A NEW CHANNEL
THEN PRESS [SELECT]
PRESS [MENU] TO EXIT.
```

THE 42 IS BLINKING

SCREEN 10b
 ADD CHANNELS - CHAN PRESSED

```
ADD A FAVORITE CHANNEL:
 03   04   05   06   07
 09   10   11   12   13
 18   95   79   --   --

PRESS [CH△] OR [CH▽] TO
  CHOOSE A NEW CHANNEL
THEN PRESS [SELECT]
PRESS [MENU] TO EXIT.
```

THE LEFT SET OF DASHES ARE BLINKING

SCREEN 10c
 ADD CHANNELS, SECOND DIGIT.

```
ADD A FAVORITE CHANNEL:
 03   04   05   06   07
 08   09   10   11   12
 18   42   5-   --   --

PRESS [CH△] OR [CH▽] TO
  CHOOSE A NEW CHANNEL
THEN PRESS [SELECT]
PRESS [MENU] TO EXIT.
```

THE 5- IS BLINKING

FIG. 15B

SCREEN 11a
REMOVE A FAVORITE CHANNEL
```
     REMOVE A CHANNEL
   03   04   05   06   07
   09   10   11 -▷12   13
   42   --   --   --   --

ADD A CHANNEL

PUT -▷ ON YOUR CHOICE
   THEN PRESS [SELECT]
   PRESS [MENU] TO EXIT.
```

SCREEN 11b
REMOVE IF ALL ARE USED
```
     REMOVE A CHANNEL
   03   04   05   06   07
   08   09 -▷10   11   12
   42   43   45   57   67

PUT -▷ ON YOUR CHOICE
     THEN PRESS [SELCECT]
   PRESS [MENU] TO EXIT.
```

SCREEN 11c
REMOVE A FAVORITE CHANNEL, LIST EMPTY
```
     REMOVE A CHANNEL
   --   --   --   --   --
   --   --   --   --   --
   --   --   --   --   --

-▷ADD A CHANNEL

PLEASE PRESS [SELECT].

PRESS [MENU] TO EXIT.
```

FIG.15C

SCREEN 15a
   TIMER MENU - SOME TIMERS USED

```
      PROGRAM TIMER

-▷ADD A PROGRAM TIMER
     CHANGE A PROGRAM TIMER
     REVIEW A PROGRAM TIMER
     CLEAR A PROGRAM TIMER

PUT -▷ ON YOUR CHOICE
     THEN PRESS [SELECT].
  PRESS [MENU] TO EXIT.
```

SCREEN 15b
   TIMER MENU, NO TIMERS USED

```
      PROGRAM TIMER

-▷ ADD A PROGRAM TIMER

PLEASE PRESS [SELECT].

PRESS [MENU] TO EXIT.
```

SCREEN 15c
   TIMER MENU, ALL TIMERS USED

```
      PROGRAM TIMER

-▷ CHANGE A PROGRAM TIMER
     REVIEW A PROGRAM TIMER
     CLEAR A PROGRAM TIMER

PUT -▷ ON YOUR CHOICE
     THEN PRESS [SELECT].
  PRESS [MENU] TO EXIT.
```

FIG.17A

SCREEN 16a
   ADD PROGRAM TIMER NUMBER

```
SELECT A TIMER TO ADD

1 SET    4        7 SET
   2 SET    5 SET    8
 -▷3        6 SET

PUT -▷ ON YOUR CHOICE
    THEN PRESS [SELECT].
 PRESS [MENU] TO EXIT.
```

SCREEN 16b
   ADD PROGRAM TIMER NUMBER LAST

```
SELECT A TIMER TO ADD

1 SET -▷4        7 SET
   2 SET    5 SET   8 SET
   3 SET    6 SET

PLEASE PRESS [SELECT].

PRESS [MENU] TO EXIT.
```

THE ARROW SKIPS SET EVENTS
SET MEANS THAT TIMER SLOT IS USED

SCREEN 17a
   SELECT THE TIMER (3) TYPE

```
PROGRAM TIMER 3

SINGLE PROGRAM
 -▷WEEKLY PROGRAM
   EVERYDAY PROGRAM
   MON-FRI PROGRAM

PUT -▷ ON YOUR CHOICE
    THEN PRESS [SELECT].
 PRESS [MENU] TO EXIT.
```

FIG.17B

SCREEN 18a
ADD SINGLE TIMER START DAY

```
PROGRAM TIMER 3

START DAY: 2ND WEDNESDAY

PRESS [CH△] OR [CH▽] TO
   CHANGE THE DAY,
THEN PRESS [SELECT].
PRESS [MENU] TO EXIT.
```

SCREEN 18b
ADD SINGLE TIMER START TODAY

```
PROGRAM TIMER 3

START DAY: 1ST FRIDAY
              TODAY

PRESS [CH△] OR [CH▽] TO
   CHANGE THE DAY,
THEN PRESS [SELECT].
PRESS [MENU] TO EXIT.
```

SCREEN 18c
ADD WEEKLY TIMER START DAY

```
PROGRAM TIME 3
START DAY: FRIDAYS
              EVERY WEEK

PRESS [CH△] OR [CH▽] TO
   CHANGE THE DAY,
THEN PRESS [SELECT].
PRESS [MENU] TO EXIT.
```

FIG. 17C

SCREEN 19a
   ADD TIMER START HOUR

```
PROGRAM TIMER 3
START DAY: FRIDAYS

START TIME: 11:53 AM

PRESS [CH△] OR [CH▽] TO
   CHANGE THE HOUR,
THEN PRESS [SELECT].
PRESS [MENU] TO EXIT.
```

THE 11 BLINKS

SCREEN 20a
   ADD TIMER START MINUTE

```
PROGRAM TIMER 3
START DAY: FRIDAYS

START TIME: 11:53 AM

PRESS [CH△] OR [CH▽] TO
   CHANGE THE MINUTE,
THEN PRESS [SELECT].
PRESS [MENU] TO EXIT.
```

THE 53 BLINKS

FIG. 17D

SCREEN 21a
    ADD TIMER LENGTH HOURS

```
PROGRAM TIMER 3
START DAY: FRIDAYS
START TIME: 11:53 AM

LENGTH:  0:00

PRESS [CH△] OR [CH▽] TO
   CHANGE THE HOUR,
THEN PRESS [SELECT].
PRESS [MENU] TO EXIT.
```

THE FIRST 0 BLINKS

SCREEN 22a
    ADD TIMER LENGTH MINUTE

```
PROGRAM TIMER 3
START DAY: FRIDAYS
START TIME: 11:53 AM

LENGTH:  0:00

PRESS [CH△] OR [CH▽] TO
   CHANGE THE MINUTE,
THEN PRESS [SELECT].
PRESS [MENU] TO EXIT.
```

THE 00 BLINKS

FIG. 17E

SCREEN 23a
ADD TIMER CHANNEL STARTING

```
PROGRAM TIMER 3
START DAY: FRIDAYS
START TIME: 11:53 AM
LENGTH: 20:00
CHANNEL: 42 ESPN

PRESS [CH▲] OR [CH▽] TO
  CHANGE THE CHANNEL,
THEN PRESS [SELECT].
PRESS [MENU] TO EXIT.
```

THE NUMBER IS THE CHANNEL TUNED
THE NUMBER BLINKS

SCREEN 23b
ADD TIMER CHANNEL AFTER CHAN

```
PROGRAM TIMER 3
START DAY: FRIDAYS
START TIME: 11:53 AM
LENGTH: 20:00
CHANNEL: --

PRESS [CH▲] OR [CH▽] TO
  CHANGE THE CHANNEL,
THEN PRESS [SELECT].
PRESS [MENU] TO EXIT.
```

THE -- BLINKS

SCREEN 23c
ADD TIMER CHANNEL SECOND DIGIT

```
PROGRAM TIMER 3
START DAY: FRIDAYS
START TIME: 11:53 AM
LENGTH: 20:00
CHANNEL: 4-

PRESS [CH▲] OR [CH▽] TO
  CHANGE THE CHANNEL,
THEN PRESS [SELECT].
PRESS [MENU] TO EXIT.
```

THE 4- IS BLINKING

FIG. 17F

SCREEN 24a
   TIMER CHANNEL UNDER PARENTAL CONTROL

```
CHANNEL 03 HDLN IS
PARENTALLY CONTROLLED.

PLEASE ENTER YOUR
PARENTAL CONTROL NUMBER.

▨ ▨ ▨ ▨ -
```

SCREEN 25a
   INCORRECTLY ENTERED NUMBER

```
PARENTAL CONTROL NUMBER
     IS INCORRECT.

PRESS [SELECT] TO
   REENTER THE NUMBER.
  PRESS [MENU] TO EXIT.
```

SCREEN 26a
   TIMER VCR REMINDER

```
       THANK YOU

REMEMBER TO
    SET YOUR VCR'S TIMER.

PRESS [MENU] TO EXIT.
```

FIG. 17G

SCREEN 27a
  REVIEW A PROGRAM TIMER

```
 1  2  3  4  5  6
 7 -▷8   END REVIEW
START DAY: FRIDAYS
START TIME: 11:53 AM
LENGTH: 20,00
CHANNEL: 42  ESPN

PUT -▷ ON YOUR CHOICE,
   THEN PRESS [SELECT].
PRESS [MENU] TO EXIT.
```

THE ARROW SKIPS EVENTS THAT ARE NOT SET
OR 2ND MONDAY, OR WEEKLY, OR MON-FRI

SCREEN 27b
  REVIEW TEMPLATE

```
 1  2  3  4  5  6
 7  8 -▷END REVIEW
START DAY:
START TIME:
LENGTH"
CHANNEL:

PUT -▷ ON YOUR CHOICE,
   THEN PRESS [SELECT].
PRESS [MENU] TO EXIT.
```

SCREEN 28a
  CHANGE OR CLEAR MENU

```
-▷CHANGE PROGRAM TIMER 3
  CLEAR PROGRAM TIMER 3

PUT -▷ ON YOUR CHOICE
  THEN PRESS [SELECT].
PRESS [MENU] TO EXIT.
```

FIG. 17H

SCREEN 29a
   CHANGE A PROGRAM TIMER

```
SELECT A TIMER TO CHANGE

1 SET    4        7 SET
    2        5 SET    8
  ->3 SET    6 SET

PUT -> ON YOUR CHOICE
  THEN PRESS [SELECT]
  PRESS [MENU] TO EXIT.
```

THE ARROW SKIPS NON-ACTIVE EVENTS

SCREEN 29b
   CHANGE A PROGRAM TIMER, ONE SET

```
SELECT A TIMER TO CHANGE 1        4      ->7 SET
    2        5        8
    3        6

PLEASE PRESS [SELECT].

PRESS [MENU] TO EXIT.
```

FIG. 171

SCREEN 30a
  CLEAR A PROGRAM TIMER

```
SELECT A TIMER TO CLEAR

1 SET    4       7 SET
   2      -▷5 SET   8
   3 SET    6 SET

PUT -▷ ON YOUR CHOICE
   THEN PRESS [SELECT]
PRESS [MENU] TO EXIT.
```

THE ARROW SKIPS NON-ACTIVE EVENTS

SCREEN 30b
  CLEAR A PROGRAM TIMER, ONE SET

```
SELECT A TIMER TO CLEAR 1        4        7
   2      -▷5 SET    8
   3        6

PLEASE PRESS [SELECT].

PRESS [MENU] TO EXIT.
```

FIG. 17J

SCREEN 36a
  PARENTAL CONTROL MENU

```
     PARENTAL CONTROL

-▷VIEW PARENTAL CHANNELS
   CHANGE PARENTALLY
      CONTROLLED CHANNELS
   CHANGE CONTROL NUMBER

PUT -▷ ON YOUR CHOICE
    THEN PRESS [SELECT].
 PRESS [MENU] TO EXIT.
```

SCREEN 37a
  VIEW PC CHANNELS

```
    PLEASE ENTER YOUR
 PARENTAL CONTROL NUMBER
        TO VIEW ALL
   PARENTALLY CONTROLLED
         CHANNELS.

▓ ▓ ▓ ▓ -
```

SCREEN 38a
  EDIT PC CHANNELS, PC NUMBER ENTRY

```
    PLEASE ENTER YOUR
 PARENTAL CONTROL NUMBER
       TO EDIT YOUR
   PARENTALLY CONTROLLED
        CHANNELS:

▓ ▓ - - -
```

IF AN INCORRECT CODE IS ENTERED,
  EXITS TO THE ON SCREEN MENUS

FIG.19A

SCREEN 39a
    EDIT PC CHANNELS MENU

```
PARENTALLY CONTROLLED:
  03   04   05   06   07
  08   09   10   11   42

SEE MORE CHANNELS
->ADD A CHANNEL
  REMOVE A CHANNEL
PUT -> ON YOUR CHOICE
  THEN PRESS [SELECT].
PRESS [MENU] TO EXIT.
```

SEE MORE CYCLES THROUGH MORE CONTROLLED
    CHANNELS.

SCREEN 39b
    PC EDIT LESS THAN 10 CHANNELS.

```
PARENTALLY CONTROLLED:
  03   04   05   06   07
  08   09   --   --   --

->ADD A CHANNEL
  REMOVE A CHANNEL
PUT -> ON YOUR CHOICE
  THEN PRESS [SELECT].
PRESS [MENU] TO EXIT.
```

SCREEN 39c
    PC EDIT WITH NO CHANNELS

```
PARENTALLY CONTROLLED:
  --   --   --   --   --
  --   --   --   --   --

->ADD A CHANNEL

PLEASE PRESS [SELECT].

PRESS [MENU] TO EXIT.
```

FIG.19B

SCREEN 40a
　ADD PARENTAL CONTROL, START

```
ADD PARENTAL CONTROL

TO CHANNEL 23 ESPN

PRESS [CH△] OR [CH▽] TO
   CHOOSE A NEW CHANNEL,
THEN PRESS [SELECT] TO
   ADD THE CHANNEL.
PRESS [MENU] TO EXIT.
```

THE CHANNEL NUMBER BLINKS

SCREEN 40b
　ADD PARENTAL CONTROL, FIRST

```
ADD PARENTAL CONTROL

TO CHANNEL --

PRESS [CH△] OR [CH▽] TO
   CHOOSE A NEW CHANNEL,
THEN PRESS [SELECT] TO
   ADD THE CHANNEL.
PRESS [MENU] TO EXIT.
```

THE DASHES BLINK

SCREEN 40c
　ADD PARENTAL CONTROL, LAST

```
ADD PARENTAL CONTROL

TO CHANNEL 5-

PRESS [CH△] OR [CH▽] TO
   CHOOSE A NEW CHANNEL,
THEN PRESS [SELECT] TO
   ADD THE CHANNEL.
PRESS [MENU] TO EXIT.
```

THE 5- BLINKS

AFTER 4 SECONDS, GOES TO 05 WITH A PID

FIG. 19C

SCREEN 41a
  REMOVE CONTROL, MORE THAN 10
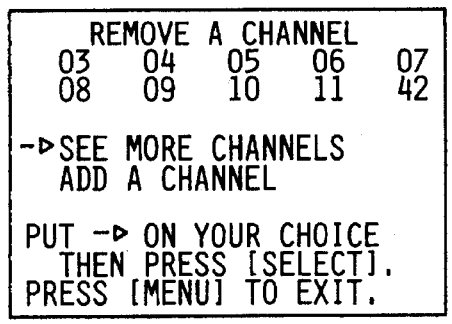
SCREEN 41b
  REMOVE CONTROL, 10 OR LESS
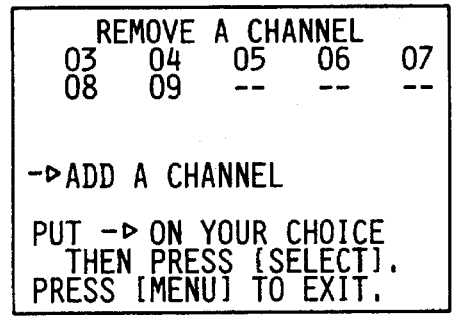
SCREEN 41c
  REMOVE CONTROL, NONE TO REMOVE
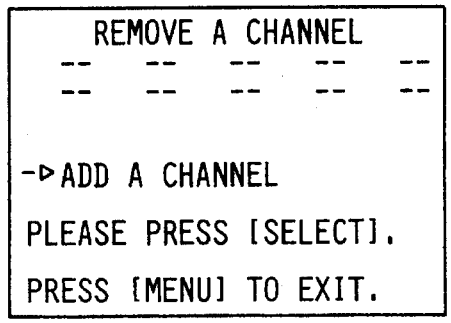
FIG. 19D SCREEN 42a
CHANGE NUMBER, OLD NUMBER, SECOND
SCREEN 42b
CHANGE NUMBER, OLD NUMBER, LAST
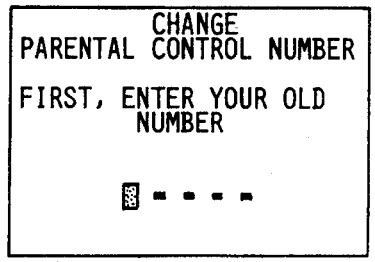
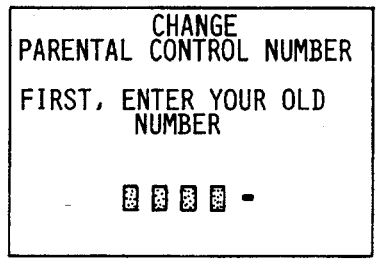
IF INCORRECT NUMBER IS ENTERED, EXIT ON SCREEN MENUS
SCREEN 43a
ENTER NEW PARENTAL NUMBER, FIRST
SCREEN 44a
VERIFY THE NEW PARENTAL NUMBER, THIRD
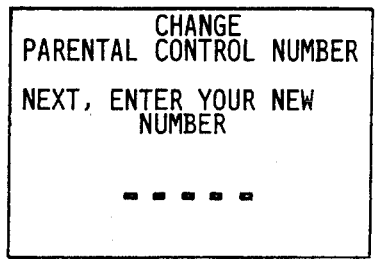
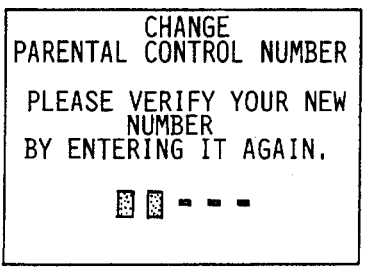
SCREEN 45a
NUMBER CHANGE SUCCESSFUL
SCREEN 45b
NUMBER NOT CHANGED
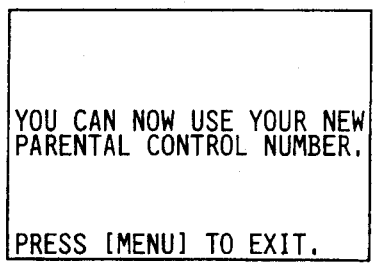
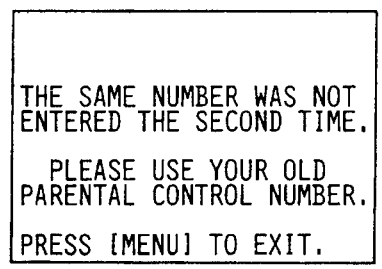
FIG. 19E SCREEN 46a
STT CONTROL MENU

```
SET-TOP CONTROL:

->ON-SCREEN DISPLAY
  POWER OUTLET
  SET-TOP STATUS

PUT -> ON YOUR CHOICE
   THEN PRESS [SELECT].
PRESS [MENU] TO EXIT.
```

SCREEN 47a
DISABLE ON SCREEN DISPLAY

```
VOLUME & CHANNEL
DISPLAYS WILL SHOW.

THEY WILL BE RECORDED
    ON YOUR VCR.

TO HAVE DISPLAYS TURNED
   OFF, PRESS [SELECT]

PRESS [MENU] TO EXIT.
```

SCREEN 48a
ENABLE ON SCREEN DISPLAY

```
VOLUME & CHANNEL
DISPLAYS ARE TURNED
       OFF.

TO HAVE DISPLAYS SHOW,
   PRESS [SELECT].

PRESS [MENU] TO EXIT.
```

SCREEN 49a
MAKE A-C OUTLET ALWAYS ON

```
POWER OUTLET STATUS:

SWITCHED POWER OUTLET

THE [POWER] KEY TURNS
POWER OUTLET ON AND OFF.

PRESS [SELECT] TO HAVE
   POWER OUTLET ALWAYS ON
PRESS [MENU] TO EXIT.
```

SCREEN 50a
MAKE A-C OUTLET SWITCHED

```
POWER OUTLET STATUS:

POWER OUTLET ALWAYS ON

PRESS [SELECT] TO HAVE
   SWITCHED POWER OUTLET
PRESS [MENU] TO EXIT.
```

FIG. 20A

SCREEN 52a
  DIAGNOSTICS

```
      SET-TOP STATUS:

CS:   AE   23   FF

DATA: NONE
  POWER OUTLET: ALWAYS ON
  OUTPUT CHANNEL: 3
  H: 1 6 9 10 11 12

PRESS [MENU] TO EXIT.
```

| STEP | LED |
|======|=====|
| 1    | "AE" |
| 2    | "23" |
| 3    | "FF" |
| 4    | "nd" |
| 5    | "on" |
| 6    | " 3" |
| 7    | " 1" |
| 8    | " 6" |
| 9    | " 9" |
| 10   | "10" |
| 11   | "11" |
| 12   | "12" |

SCREEN 52b
  DIAGNOSTICS

```
      SET-TOP STATUS:

CS:   1C   BD   F8

DATA: OK
  POWER OUTLET: SWITCHED
  OUTPUT CHANNEL: 4
  H: 6 11 12

PRESS [MENU] TO EXIT.
```

| STEP | LED |
|======|=====|
| 1 | "1C" |
| 2 | "bd" |
| 3 | "F8" |
| 4 | "dC" |
| 5 | "oF" |
| 6 | " 4" |
| 7 | " 6" |
| 8 | "11" |
| 9 | "12" |

FIG. 20B

METHOD AND APPARATUS FOR PROVIDING AN ON-SCREEN USER INTERFACE FOR A SUBSCRIPTION TELEVISION TERMINAL

This application is related by subject matter to application serial Nos. 07/800,002, 07/800,241 and 07/799,987 filed Nov. 28, 1991 of the same assignee.

BACKGROUND OF THE INVENTION

1. Technical Field

The present invention relates to the field of subscription television terminal equipment and, more particularly, to a method and apparatus for providing an on-screen user interface for a subscription television terminal.

2. Description of Relevant Art

In the field of television terminal equipment generally, it is now known to provide a user of such equipment with control over many features never before available. For example, one commercially available television set known in the art provides a sophisticated remote control device for controlling such features as picture-in-picture, wake-up alarm, sleep timing, skip timing and predetermined time channel tuning. An on-screen menu is displayed upon actuation of a "set up" key of a key pad of the remote control device for setting the terminal in a predetermined desired condition to provide these features. Repeated actuation of the "set up" key moves a cursor comprising a right-pointing arrow through choices presented on three different menus. A user selects an item from the menu by leaving the menu screen in a particular state. For example, for one on-screen display, a user is presented with a choice among two items, TV/ANT or CABLE, indicated by a right-pointing arrow pointing to both choices. By using a multi-function "level+" or "level−" key, the user toggles the type of television tuning between cable and broadcast television. The selected choice appears in "red" color.

A new purchaser setting up this television receiver in their home is often shocked when they connect their new set to their antenna and they are unable to tune to UHF broadcast stations, because their new television receiver is preset at the factory to "cable" tuning. It may take the new owner hours before they are able to understand how to "set-up" their new television through repeated reference to their "operating instructions" or repeated calls to their salesman.

One feature available with this known television set is a sleep timer feature. Many television viewers watch late night television and find themselves falling asleep without turning off their televisions. They may be awakened, for example, by the sounds of test signals broadcast by a television station going off the air at an early morning hour resulting in a fitful, restless sleep. The sleep timer is a feature whereby a late night viewer may be assured that their television set will be automatically turned off after a predetermined period of time. There is a requirement in the art to implement such a feature in a subscription television terminal so that owners of television sets not having this feature may still enjoy the feature if they subscribe to cable services.

In the field of video cassette recorders (VCR), one commercially available VCR known in the art provides a similar on-screen menu with enumerated selections. A key labeled "program" is provided to enter or exit a menu system. The user actuates a number-labeled key corresponding to a numbered selection to enter the next menu or submenu.

Another known VCR operates in a similar manner. Yet, this VCR provides on screen prompts or instructions for operating modes, other than an event programming mode. In other words, user friendly instructions are provided with each menu screen displayed to assist the users through the menu selection process. Theoretically, a user having the on-screen instructions will not have to refer to an instruction manual for guidance through the menu selection process.

Yet another known VCR provides a cursor access method to access menu items to be selected. Keys for menu entry and selection of choices are identified with Menu, Select, Set+, and Set− labels. The Set keys are used for identifying an item to be selected as well as for other user functions. However, this use of the same keys for multiple functions confuses the user of the remote control. Users often find themselves paging through instruction manuals trying to locate how they can safely escape from the menu semen they find themselves in without jeopardizing the initialization of features they think they have already determined.

In a cursor method of selection, three methods are known in the art of VCR programming for indicating which of a series of menu items is available for selection: blinking the numbers for each item, providing a dot next to the item for selection, or providing an arrow pointing to the right, the arrow being located next to the item to be selected. For example, one known VCR with cursor control causes the numbers to blink next to the choice for selection.

In the art of subscription television terminals, sometimes referred to herein as set top terminals, the development of user on-screen initialization of the terminal has paralleled the television receiver and VCR fields. According to Lee R. Johnson et al. U.S. Pat. No. 4,987,185, incorporated herein by reference thereto, a terminal in a closed circuit television system of a hotel or hospital is remotely configured using a hand-held remote control. Keys of the keyboard such as channel up and channel down indicators are used for channel selection and other functions as well as during terminal set-up or initialization.

For example, according to U.S. Pat. No. 4,987,185, incorporated herein by reference, the channel up and channel down indicators are used in this system to toggle between a switched and non-switched condition of a power outlet and/or to and from an interlaced screen condition. Furthermore, according to U.S. Pat. No. 5,001,554, incorporated herein by reference thereto, the channel up key is used in this same sytem for quitting either a parental control or a premium channel menu structure. The parental control/premium channel feature disclosed in U.S. Pat. No. 5,001,554 permits a hotel guest to arrange for parental guidance control over premium channel movies delivered to hotel rooms. In a manner similar to the operation of one known VCR, a user uses digit-labeled keys to actuate numbered choices on a displayed menu.

In the Scientific-Atlanta brand Model 8590 cable television terminal, labels such as A U, RCL, and SEL are used for keys for feature selection such as to recall channels. While abbreviated key labels are useful and to some extent friendly to a user, it may not be particularly obvious to the user, for example, that RCL stands for recall or how the "recall" function key is to be used.

Consequently, the features that may be provided by a subscription television terminal have increased greatly. In the field of subscription television terminals and with the advent of optical fiber networks and links to telecommunications networks, there is no end to the types and qualities of features which may be provided by such terminals.

Already, subscription television terminals are being used for addressed message transmission, pay-per-view, favorite channel memory, program timing, parental guidance, and terminal control or set-up features. Home shopping, travel reservations service, home banking, energy management, video conferencing and other such services, which may be accomplished in the future over a cable television network, are only limited by the imagination.

Generally, there remains a need in the art to provide a more user friendly interface for any such services accessible through a limited number of keys or related means for data input of a subscription television terminal. The user friendly interface should not be confusing to the user. To the contrary, the interface should be easier to operate and not require reference to a user manual for instruction.

SUMMARY OF THE INVENTION

Accordingly, it is an object of the invention to provide an improved user friendly interface for a subscription television terminal. In this manner, the first-time user should not be afraid to use their assigned subscription televsion terminal.

It is another object of the invention to provide an improved user friendly interface to a subscription television terminal which utilizes on-screen displays to accustom the user to operating the terminal. In this manner, the user should not be required to refer to a user manual for instruction.

In order to accomplish these objects, it is a further object of the invention to minimize the procedures associated with terminal initialization while at the same time maximize the number and quality of terminal features provided to the user. The user then would be able to easily utilize the terminal to its fullest capabilities.

It is a further object of the invention to avoid requests for multiple data entries to a particular on-screen menu and to display the minimal amount possible of data to make a request. In this manner, a non-threatening appearance of an on-screen display is created for a user.

It is a further object of the invention to employ an arrow icon in an on-screen display having a corresponding arrow key of a subscriber input device, the arrow icon serving as a cursor for moving in one direction through a list of choices of a given menu. The matching arrow icon and the key avoid the multilevel association of functions to words and/or numbers to keys found in conventional televison terminals or associated appliances.

It is a further object of the invention to organize a data entry key pad into groups of closely positioned and conveniently arranged keys comprising, in particular, a function grouping, a digit grouping, an initialization grouping, a channel grouping and an audio grouping. In this manner, the user may more easily locate keys for controlling operation of an associated terminal.

It is a further object of the invention to minimize the number of keys used for terminal initialization to three such keys, a MENU key, the already described right-pointing arrow labeled key, and a select key. The fewer the keys for terminal initialization, the easier the process should be.

It is a further object of the invention to minimize the use of multi-function keys for terminal initialization, the primary exception being the CH+ and CH− keys used, for example, to change parameters during program timer setting. In this manner, the confusion resulting from multi-function keys may be eliminated.

It is a still further object of the invention to provide on-screen instructions to a user to assist them in enjoying the features of the invention and to provide visual correspondence to keys of a user input device in such instructions, for example, by the use of brackets.

It is a still further object of the invention to provide a sleep timer feature in a subscription television terminal. Using this feature, a subscriber in the habit of watching late night television will not be inadvertently awakened before they want to be by television broadcast test signals or noise.

It is a still further object of the invention to provide a messaging feature in a subscription television terminal. In this manner, a subscriber may be informed by the subscription television system operator of messages of individual or global relevance.

It is a still further object of the invention to provide an impulse pay-per-view feature in a subscription television terminal. In this manner, a subscriber may purchase premium event programming immediately and without having to advise the system operator.

It is a still further object of the invention to provide a favorite channel feature in a subscription television terminal. In this manner, a subscriber may establish a list in terminal memory of favorite channels, and, consequently, gain access to them quickly by actuation of a favorite channel key of a subscriber input device.

It is a still further object of the invention to provide a program timing feature in a subscription television terminal. In this manner, a subscriber may record programs on an associated video cassette recorder (VCR) without having to be present.

It is a still further object of the invention to provide a parental control feature in a subscription television terminal. In this manner, an adult subscriber having access to a parental control code may change their code, view a parentally controlled program and define a list of parentally controlled channels for storage in terminal memory.

It is a still further object of the invention to provide a subscription television terminal control feature. In this manner, a subscriber may change the status of a switched power outlet of the terminal, enable or disable on-screen display or perform diagnostics on the terminal.

In accordance with the principles of the invention, apparatus for initializing a subscription television terminal comprises a key pad having a plurality of keys arranged in groupings of keys, a first key grouping of function keys, a second key grouping of channel keys, a third key grouping of digit keys, a fourth key grouping of initialization keys, and a fifth key grouping of audio keys. By grouping a key pad into groupings of keys, a user of the key pad is better able to locate the keys of each of the key groupings. The key groupings are further arranged linearly or in a matrix in a predetermined rational relationship to further promote the user friendliness of the key pad for terminal operation. A terminal according to the invention further comprises control means for sensing the actuation of keys and an on-screen controller, responsive to the control means, for generating on-screen displays for display on an associated television set. For terminal set-up or initialization, only a menu-labeled key, a right-pointing arrow key, and a select key need be utilized by a user. Consequently, the confusion of multi-function keys may be avoided.

A method for terminal initialization according to the principles of the invention comprises the steps of generating a display of menus of a menu structure, actuating the movement of a cursor in one direction through choices of a generated menu and actuating a selection of a menu choice via a selection key. In this manner, the user only follows three steps to terminal initialization which are repeated as the user places the terminal in a desired condition for a number of features.

One feature according to the present invention is that of actuating a sleep timer by a method comprising the steps of generating an on-screen display for sleep timer settings including an Off condition and instructions for actuating the feature. The method futher comprises the step of changing the sleep timer setting for storage in terminal memory according to user control. However, if a predetermined period of time lapses, the last sleep timer setting displayed will become the sleep timer setting stored. In this manner, a user is able to implement a sleep timer for night-time television viewing. When the time set in the sleep timer lapses, an associated television set will be turned off via a switched power outlet of the terminal. Thus, the user may view cable television channels at night without being concerned they will be awakened by the continued over-night operation of their associated television set.

Another feature which may be initialized via a method of initializing a cable television terminal according to the invention is a parental control feature. A first parental control code is provided in a secret manner to an adult subscriber. The code is also downloaded from a headend for storage in that subscriber's terminal. According to an on-screen display selected from a main menu, the adult subscriber then actuates a selection for changing the parental control code, viewing a parentally controlled channel, or defining a new list of parentally controlled channels in terminal memory. In this manner, access to channels in parental control memory is limited to those having knowledge of the parental control code.

Other features of the subscription television terminal of the invention explained herein include messaging, pay-per-view, favorite channels, program timing, and subscription terminal control.

A more complete appreciation of the invention and many of the attendant advantages thereof will be readily obtained as the invention becomes better understood by reference to the following detailed description when considered in connection with the accompanying drawings.

BRIEF DESCRIPTION OF THE DRAWINGS

FIGS. 3A, 3B, and 3C provide details of the on screen display controller 306 of FIG. 3.

FIG. 3A is a schematic block diagram of the on-screen display control circuit 306 of FIG. 3.

FIG. 3B illustrates memory locations of RAM 1302 of the on-screen display of FIG. 3A.

FIG. 3C illustrates the configuration of the on-screen display as providing, for example, ten rows of twenty-four characters each.

FIG. 6A is a representation of several on-screen displays for time, channel number, and program identification.

FIG. 6B is a representation of several on-screen displays for direct channel access.

FIG. 6C is a representation of several on-screen displays for displaying volume level.

FIG. 6D is a representation of two on-screen displays for showing the status of a sleep timer.

FIG. 6E is a representation of two on-screen displays for alerting a subscriber to buy a premium event.

FIG. 6F is a representation of several on-screen displays for buying a pay-per-view event.

FIG. 7A is a representation of the several on-screen displays (OSD) represented by the main menu entered from FIG. 6.

FIG. 9 is a representation of the on-screen displays for sleep timing.

FIG. 11 is a representation of several of the on-screen displays for message delivery, whose state diagram is represented by FIG. 10.

FIG. 13A is a representation of several of the on-screen displays for pay-per-view.

FIG. 13B is a representation of remaining on-screen displays for pay-per-view.

FIG. 15A is a representation of several of the on-screen displays for favorite channels.

FIG. 15B is a representation of further on-screen displays for favorite channels.

FIG. 15C is a representation of remaining on-screen displays for favorite channels.

FIG. 17A is a representation of several of the on-screen displays for program timing.

FIG. 17B is a representation of further on-screen displays for program timing.

FIG. 17C is a representation of further on-screen displays for program timing.

FIG. 17D is a representation of further on-screen displays for program timing.

FIG. 17E is a representation of further on-screen displays for program timing.

FIG. 17F is a representation of further on-semen displays for program timing.

FIG. 17G is a representation of further on-screen displays for program timing.

FIG. 17H is a representation of further on-screen displays for program timing.

FIG. 17I is a representation of further on-screen displays for program timing.

FIG. 17J is a representation of remaining on-screen displays for program timing.

FIG. 19A is a representation of several of the on-screen displays for parental control.

FIG. 19B is a representation of further on-screen displays for parental control.

FIG. 19C is a representation of further on-screen displays for parental control.

FIG. 19D is a representation of further on-screen displays for parental control.

FIG. 19E is a representation of remaining on-screen displays for parental control.

FIG. 20A is a representation of several of the on-screen displays for terminal control described in the state diagram of FIG. 20.

FIG. 20B is a representation of remaining on-screen displays for set-top control described in the State diagram of FIG. 20.

DETAILED DESCRIPTION

The method and apparatus of the present invention is preferably implemented in an in-band cable television system as described below. Additional details of the in-band system discussed below are set forth in commonly assigned U.S. Pat. No. 5,058,160, incorporated herein by reference thereto. A subscription television terminal having features of the present invention is described in "Model 8600 Set-Top Terminal User's Guide," publication no. 69T283Z available from Scientific-Atlanta, Inc.

Figure 1:
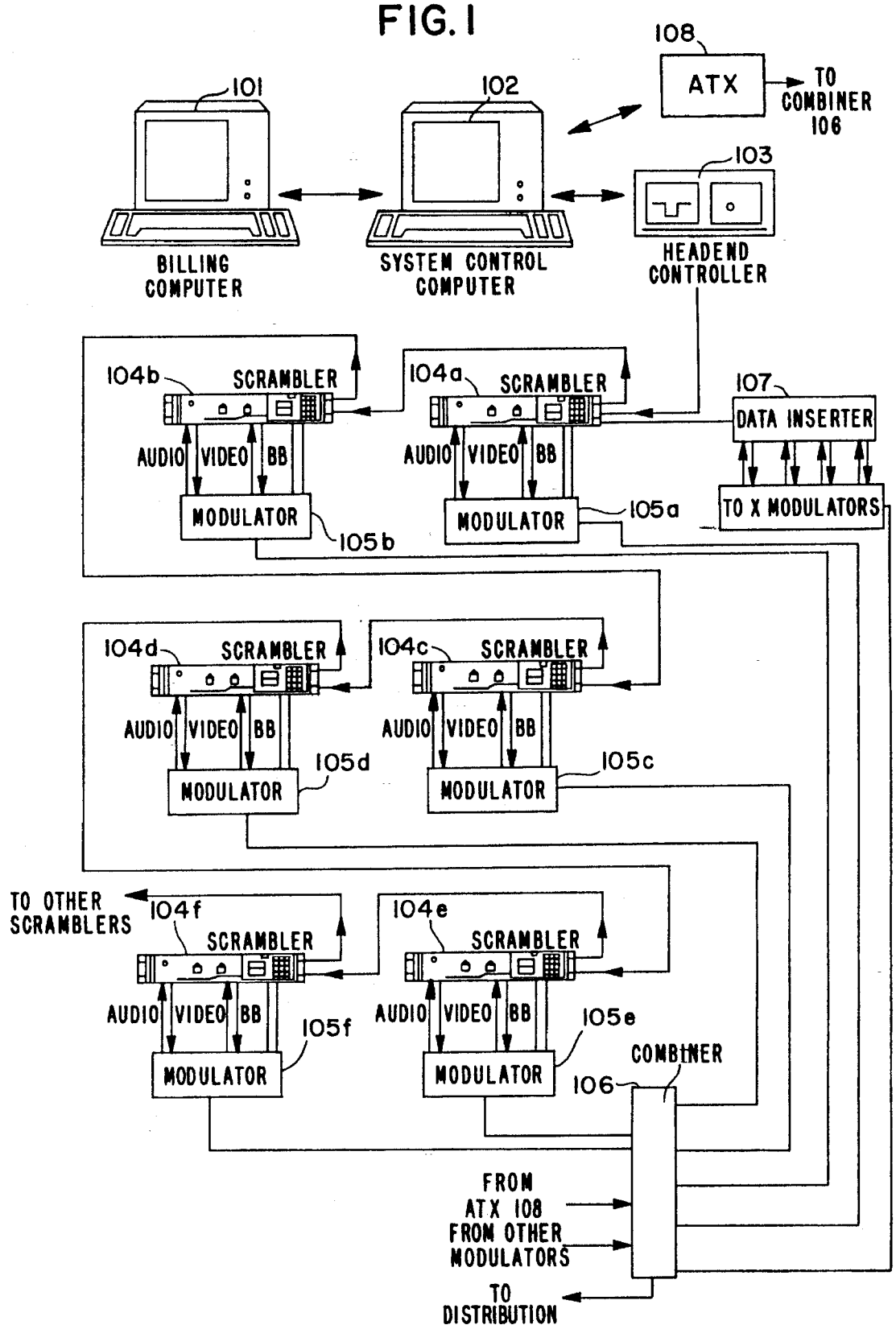
FIG. 1 is a block schematic diagram of a cable television system in accordance with the principles of the present invention in which data, for example, for enabling and disabling services may be addressably transmitted to cable television terminals from a headend.

FIG. 1 is a block diagram of a headend for a subscription television system in accordance with the present invention. Billing computer 101 includes a subscriber database and generates a monthly bill for the subscribers in the system based on level of service and any pay-per-view and impulse pay-per-view purchases. System control computer 102 such as an HP-1000 interfaced to billing computer 101. System control computer 102 receives transactions such as authorization transactions from billing computer 101 and formats and forwards transactions to headend controller 103 and addressable transmitter (ATX) 108. System control computer 102 also generates system set-up parameters such as scrambled channels. System control computer 102 configures tuning frequencies of the channels provided to the subscribers and controls on-screen display as described in greater detail below. A system control computer interface is responsible for gathering and appropriately routing the data leaving the system control computer 102. Out-of-band data is sent to addressable transmitter 108 and in-band data is sent to headend controller 103.

Addressable transmitter 108 transmits data to out-of-band subscriber terminals via a dedicated FM data channel such as a 108.2 MHz data channel in the cable television distribution system. This channel, known as a data carrier, is used to transmit both addressable commands intended for a particular out-of-band subscriber terminal and global commands intended for all out-of-band subscriber terminals in the system. Out-of-band subscriber terminals contain a receiver that is listening to the commands sent over this data channel. Unlike the in-band transactions described in greater detail below, out-of-band subscriber terminals receive data over this out-of-band channel no matter what other channel the out-of-band subscriber terminal is tuned to.

Headend controller 103 is coupled to system control computer 102 and formats system control transactions for scramblers 104a–104f. Headend controller 103 stores all transactions and has the ability to perform continuous refreshes. The requirement to constantly, repetitively and efficiently transmit the information base arises from one basic reason: since there is no permanently tuned data channel for in-band data transactions, all information flow to the subscriber terminals is subject to the indeterminate availability of a data path to the subscriber terminals. However, to further complicate matters, some of the information is real time critical, i.e., the information may pertain to events that are currently in progress or the information may be critical to maintenance or service changes. In other instances, information, although less time critical in nature, may be of considerable value. Some information is pertinent only to certain of the data streams while certain information causes a write to nonvolatile memory in the subscriber terminals and must be sent quickly at minimum intervals.

In an in-band data transmission system from the headend to in-band subscriber terminals, headend controller 103 transmits different groups of data on a serial data channel to the scramblers 104a–104f. These data groups or data streams are: (1) OFF channel data, (2) barker channel data, (3) pay-per-view (PPV) data, (4) premium channel data, (5) scroll channel data, and (6) message channel data. Reference should be made to the above-identified U.S. Pat. No. 5,058,160 for details of data streams (1)–(4). Data streams (5) and (6) relate to the communication of information from a system operator to subscribers and Will be discussed in greater detail below and in commonly assigned application Ser. No. 07/799,987 entitled "Method and Apparatus for Providing Message Information to Subscribers in a Cable Television System" filed Nov. 29, 1991 and incorporated herein by reference.

Each of these six data streams has a unique group address that is received only by scramblers having a matching address. For instance, premium channel data may have a group address of 01, and therefore all scramblers on premium channels should have a group address of 01. Headend controller 103 determines which data is output in each of the six data streams.

Scramblers 104a–104f are coupled to headend controller 103 and may be used to selectively scramble television signals for improved security in a subscription television system that utilizes subscriber terminals appropriately equipped with descrambling circuitry. The video and/or audio, for example, may be scrambled in any manner known in the art including sync suppression and video inversion. Furthermore, scrambling of premium services may be utilized side-by-side with interdiction equipment for transmitting premium services in the clear but applying jamming signals as the premium service enters the subscriber's premises.

For illustrative purposes only, it is assumed that scramblers 104a–104f correspond only to data streams (1) to (6) identified above. In accordance with the present invention, but only for illustrative purposes, two types of scramblers may be utilized. Scramblers 104a–104d may simply amplitude modulate data from headend controller 103 onto an audio IF signal of channel modulators 105a–105d. Thus, scramblers 104a–104d are preferably utilized with data contained in data streams (1)–(4). Scramblers 104e and 104f may, on the other hand, store data from headend controller 103 and send it out on a refresh basis. Scramblers 104e and 104f, then, may be preferably utilized with data contained in data streams (5) and (6).

The outputs of scramblers 104a–104f are respectively supplied to modulators 105a–105f. The outputs of modulators 105a–105f are supplied to combiner 106 which outputs a television signal for distribution over a distribution system to subscriber terminals. Data from scramblers 104a–104f can also be provided to data inserter 107 for the transmission of in-band data on non-scrambled channels.

Figure 2:
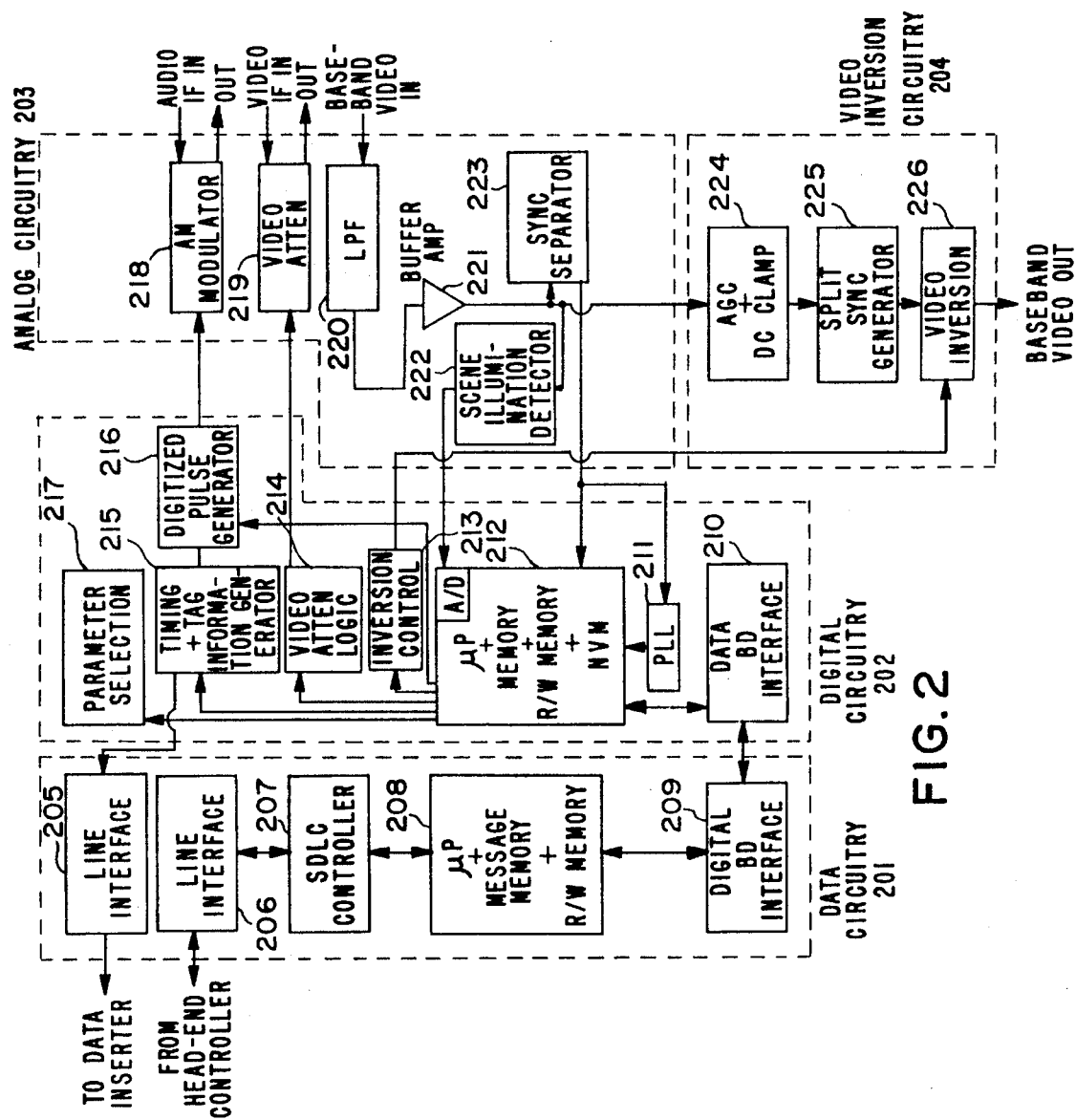
FIG. 2 is a block schematic diagram of the scrambler of FIG. 1 for scrambling television signals, but more importantly to the present invention, for transmitting feature data within a scrambled channel to a cable television terminal according to FIG. 3.

FIG. 2 is a block diagram of a scrambler 104 according to the present invention as shown in FIG. 1, and may be scrambler 104f, for example. Scrambler 104f includes data circuitry 201, digital circuitry 202, analog circuitry 203, and video inversion circuitry 204. Data circuitry 201 includes line interfaces 205 and 206, synchronous data link controller (SDLC) 207, microprocessor 208, and digital circuit interface 209. Link controller 207 controls communication via line interface 206 between scrambler 104f and headend controller 103. Microprocessor 208 receives and processes information from link controller 207. Information such as message information is stored in non-volatile memory of microprocessor 208. To insure the availability of sufficient memory for storing messages to the various subscribers in the system, there is provided preferably at least 128 K of non-volatile memory. Read/write memory of microprocessor 208 stores temporary information. Digital board interface circuit 209 interfaces the data circuitry 201 to the digital circuitry 202.

Digital circuitry 202 includes digital board interface circuit 210, phase locked loop 211, microprocessor 212, inversion control circuit 213, video attenuation logic 214, timing and tag information generator 215, digitized pulse generator 216, and parameter selection circuit 217. Interface circuit 210 interfaces digital circuitry 202 with data circuitry 201. Microprocessor 212 controls all essential functions and features of scrambler 104f. Microprocessor 212 extracts and processes data from the data circuitry 201 and controls the scrambling modes of the system. Digitized pulse generator 216 generates the specific pulses placed on the sound carrier via the analog circuitry under the control of microprocessor 212. These pulses represent descrambling data, timing data, and addressable data. The addressable data includes message data extracted from the non-volatile memory of microprocessor 208. Microprocessor 212 is also coupled to parameter selection circuitry 217 which may be a front panel display and keyboard which permits an operator to select various modes of operation, e.g., scrambling.

Analog circuitry 203 includes A M modulator 218, video attenuation circuitry 219, low pass filter 220, buffer amplifier 221, scene illumination detector 222, and synchronization separator 223. AM modulator 218 modulates the pulses from pulse generator 216 onto an audio IF signal from modulator 105f and outputs the modulated signal to modulator 105f. Video attenuation circuitry 219 selectively provides sync suppression type scrambling and attenuates a video IF signal from modulator 105f under the control of video attenuation logic 214.

Baseband video input is filtered with low pass filter 220 which may be a sharp cut-off phase equalized low pass filter. Low pass filter 220 removes high frequency noise that can interfere with the baseband video and removes the audio carrier information. After filtering, the video is amplified back to its original level by video amplifier 221. Sync separator 223 extracts synchronization information which is then sent to microprocessor 212 to provide timing information such as composite and vertical sync and odd/even field indication. Scene illumination detector 222 determines the average luminance level of the scene which is supplied to an A/D converter of microprocessor 212. Microprocessor 212 uses this luminance information to detect scene changes in order to determine when scrambling modes may optimally be changed. The composite synchronization signal is supplied to the input of phase locked loop (PLL) 211. Phase locked loop 211 locks the system clock to the line rate.

The baseband video signal from amplifier 221 is also supplied to video inversion circuitry 204. Video inversion circuitry 204 includes automatic gain control (AGC) and DC clamping circuitry 224, split sync generator 225, and video inversion circuit 226. The AGC of circuit 224 adjusts the incoming signal to a predetermined value such as 1 V peak to peak. The DC clamping of circuitry 224 forces the bottom of the sync tip to be at ground. The output of circuitry 224 is supplied to a split synchronization circuit 225. The details of split synchronization circuitry is discussed in detail in commonly assigned U.S. Pat. No. 4,924,498, incorporated herein by reference. The output of split synchronization circuitry 225 is provided to inverting circuitry 226 for inverting the baseband video about an inversion axis. Inversion is controlled in accordance with signals from inversion control circuit 213.

A scrambler, for example, scrambler 104e may receive a scroll channel data stream (5) as defined above from headend controller 103. The scroll channel data includes character information which defines so-called barker screens for promoting system services. These on-screen displays are designed at the headend by the system operator on system control computer 102. Scrambler 104e may be configured in the same manner as scrambler 104f but, because of the limited data required for scroll data barker screens, need not include a 128 K memory. Rather, a 32 K non-volatile message memory may be provided for microprocessor 208. Further details of scramblers 104a–104f may be found in the U.S. Pat. No. 5,058,160.

Figure 3:
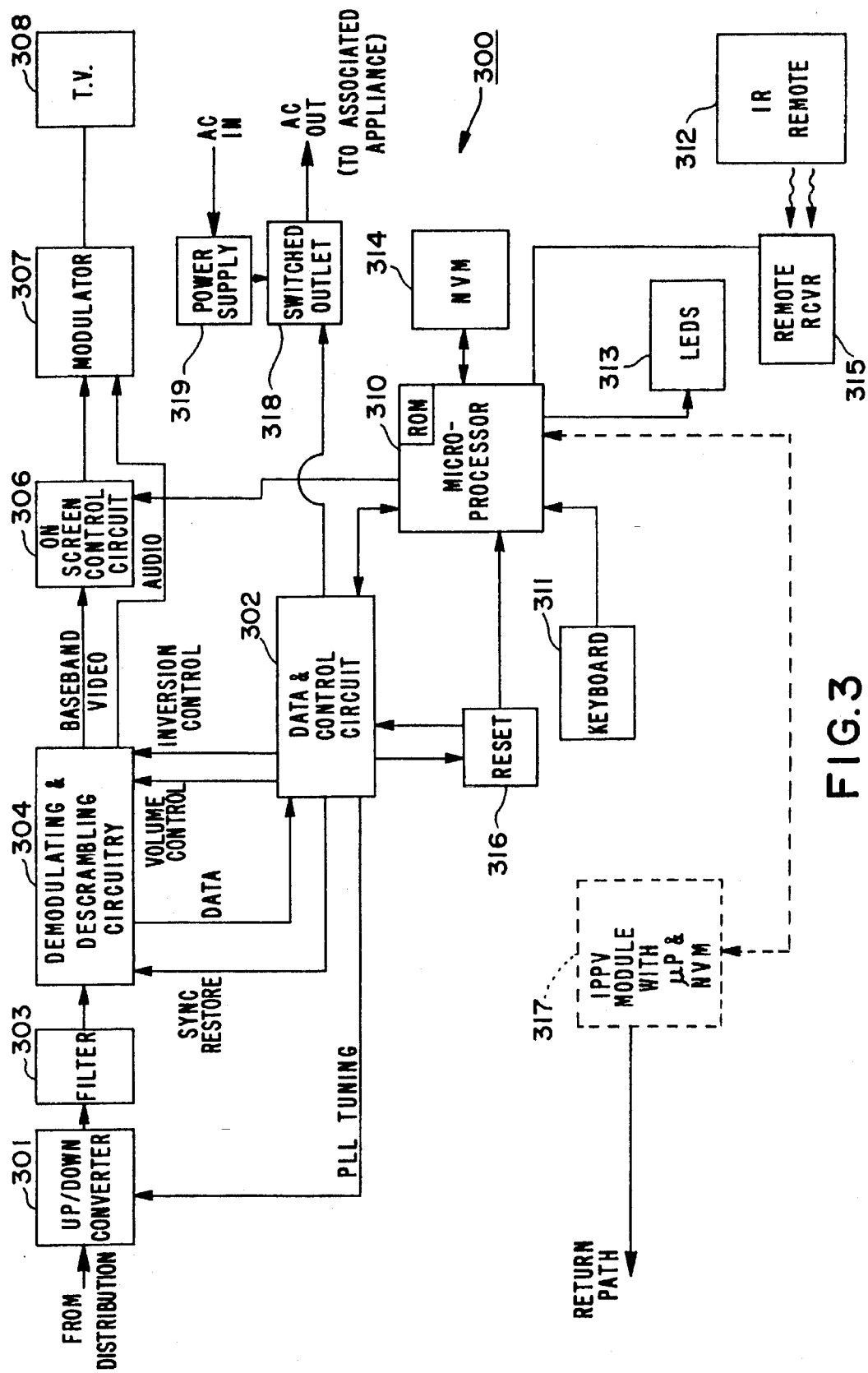
FIG. 3 is a block schematic diagram of a cable television terminal in accordance with the present invention providing on-screen initialization of features, including a remote control.

FIG. 3 is a block diagram illustrating the components of a baseband subscriber terminal 300 in accordance with the present invention. The signal from the cable is supplied to up/down converter 301. Up/down converter 301 uses a phase,locked loop under the control of control and data circuit 302, which preferable comprises an application specific integrated circuit (ASIC), to convert the RF input signal to a 45 megahertz IF signal. IF filter 303 such as a sawtooth filter filters the IF signal. Demodulating and descrambling circuit 304, under the control of data and control circuit 402, demodulates and descrambles the filtered signal and performs automatic gain control and gain restoration as required. Demodulating and descrambling circuit 304 also performs pulse detection to recover the information modulated onto the audio carrier. The recovered information is supplied to control and data circuit 302. The demodulation and descrambling circuit 304 converts the input signal to a baseband signal and selectively inverts the baseband signal under the control of control and data circuit 302 in accordance with recovered descrambling information. The audio is also supplied to demodulation and descrambling circuit 304 and is brought to baseband and performs volume control as described in U.S. Pat. No. 5,054,071, incorporated herein by reference.

The output of descrambling circuit 304 is an unscrambled baseband video signal which is supplied to on-screen display control circuitry 306. On-screen display control circuit 306 is preferably a Mitsubishi M50554 on screen display controller. On-screen display control circuit 306 selectively supplies on-screen data to the video signal which is then supplied to modulator 307. The on-screen display is selectively overlaid on the video signal, so a viewer can continue to watch a program, or provided in place of the program video with a suitable plain-colored background. Modulator 307 selectively outputs the signal from display control circuit 306 on either channel 3 or 4 which is supplied to a television 308.

Figure 4:
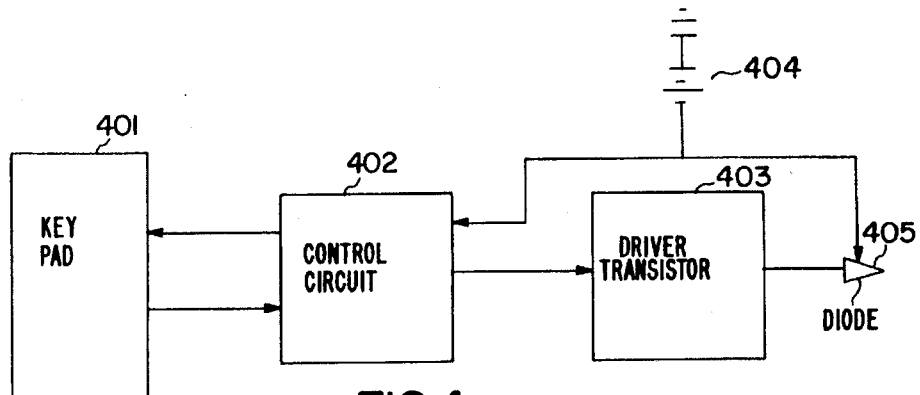
FIG. 4 is a block schematic diagram of the remote control device 312 of FIG. 3 for use with the cable television terminal of the present invention.

Microprocessor 310 controls the overall operation of subscriber terminal 300. Microprocessor 310 interfaces with data and control circuit 302. As taught in U.S. Pat. No. 5,001,554, a switched power outlet 318 may be operated by a gate array which may be control and data circuit 302 via microprocessor 310. When a subscriber uses terminal keypad 311 or a keypad of remote control 312 to tune channels, control and data circuit 302 controls the tuning of up/down converter 301 under control of microprocessor 310. For example, the microprocessor 310 senses the input of a channel indication via the actuation of two successive digit keys of key-board 311. Via data and control circuit 302, demodulating and descrambling circuit 304 tunes to the desired channel. Every time a channel is changed, the phase locked loop of demodulating and descrambling circuit 304 must be changed. Any tuning information comes from the microprocessor 310 through the control and data circuit 302 (ASIC). The control and data circuit 302 also conrols descrambling. The microprocessor 310 functions to authorize the control and data circuit 302 to descramble if the selected channel is a scrambled premium channel. Microprocessor 310 determines whether data and control circuit 302 carries out descrambling on the basis of authorization data, message streams (3) and (4) defined above, downloaded from the system control computer 102 of FIG. 1. The actuation of keys on either keyboard 311 or the remote control keyboard 401 of FIG. 4 are supplied to the microprocessor 310 and appropriate actions performed.

LED display 313 is utilized, for example, to display selected channel numbers and diagnostics. Referring briefly to FIG. 3D, there is shown the front panel of terminal 300 including an LED display and keys of a key pad 311. The two digit display 322 shown may be used not only for selected channel numbers and diagnostics, but also as a two digit indication of volume as will be further discussed herein.

The NVM 314 stores all the permanent data, e.g., authorizations, terminal configurations, composition of many of the on-screen displays (OSD) as further described herein and such. NVM 314 stores the database which conforms to the billing system.

Subscriber terminal 300 may include a plug-in module 317 for controlling so-called impulse pay-per-view transactions. Module 317 allows a subscriber to authorize their subscriber terminal to receive authorization and event data for a pay-per-view event (data stream (3) defined above), store the data associated with the purchase of that event in non-volatile memory, and transmit the data to the system operator via a telephone return path or radio frequency data return path through the cable distribution system. The subscriber is then billed for the purchased events.

Terminal 300 is powered by alternating current as represented by AC IN. The power is converted by power-supply 319 for application to power each of the elements of the terminal requiring power. The AC power is provided via a switched outlet 318 to power associated appliances at AC OUT. The switched outlet is controlled by the subscriber as will be further described herein and the microprocessor 310 retains its state in NVM 314 or random access memory. The switched outlet is shown controlled by the microprocessor 310 via data and control circuit 302. In an alternative embodiment the switched outlet 318 is controlled directly by microprocessor 310.

Figure 3A:
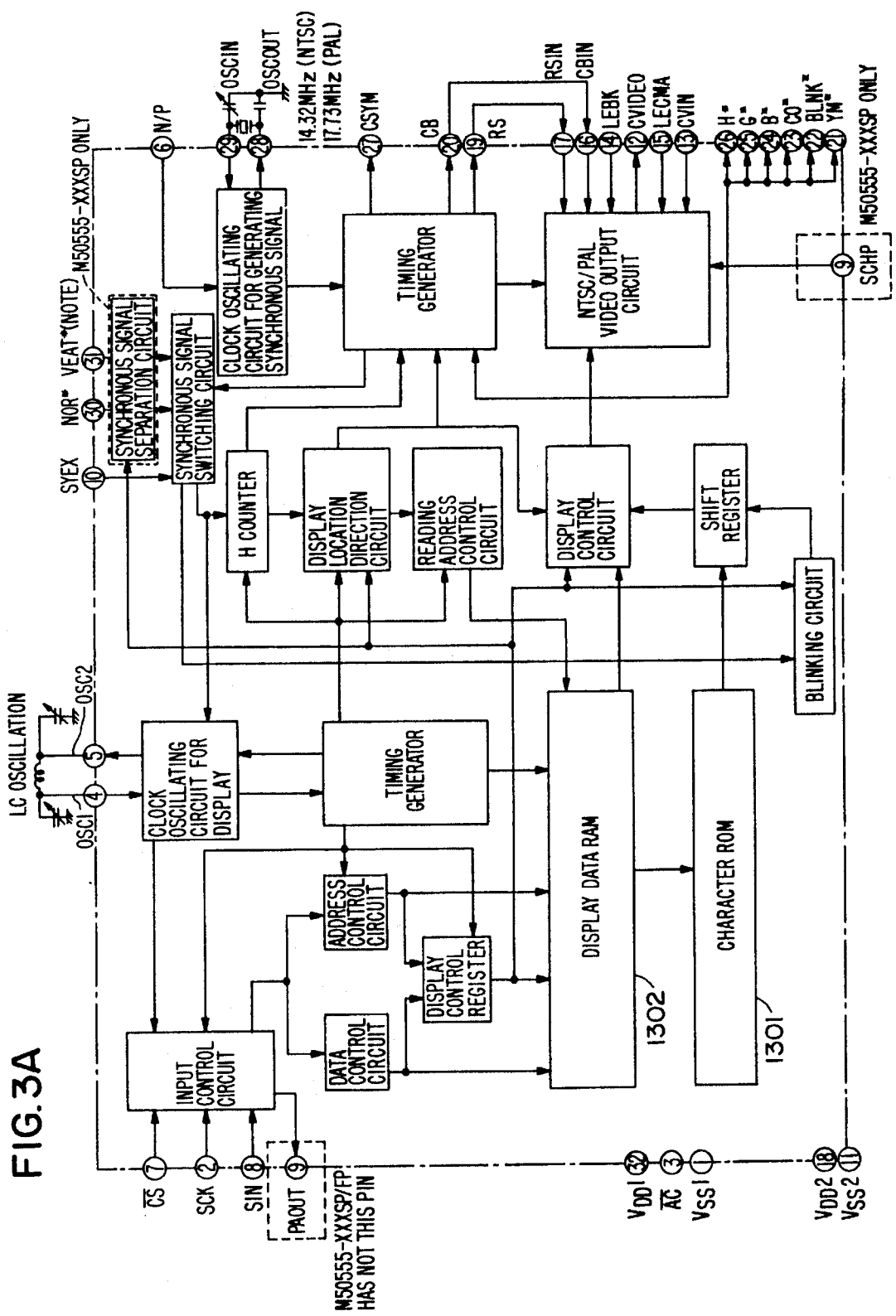
Figure 3D:
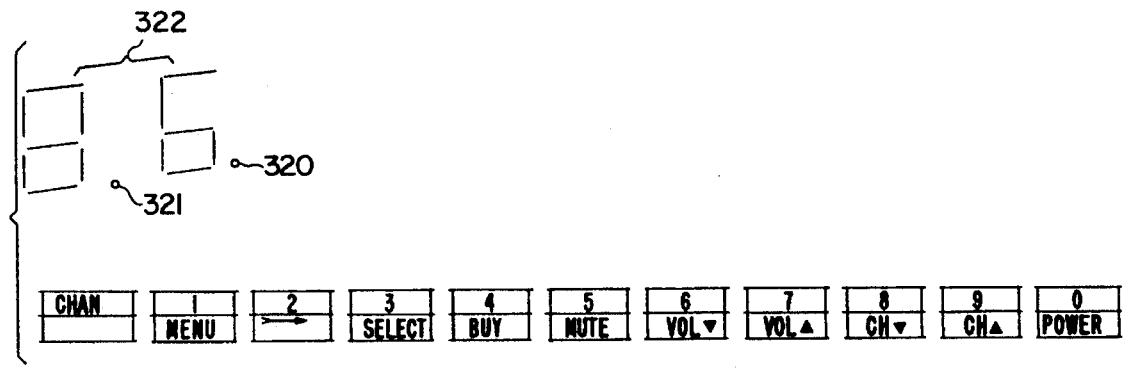
FIG. 3D provides details of the LED display 313 and key pad 311 of the terminal of FIG. 3.

FIG. 3A is a block diagram of the Mitsubishi M50455 on-screen display controller which comprises on-screen display control circuit 306. On screen display control 306 includes character ROM 1301 for storing a character set. In a preferred embodiment, character codes for generating the following sixty-four characters are stored in character ROM 1301:

capital letters A–Z
cursor—icon
numbers 0–9
blank volume level
four volume level bars
[ ] ? - : $ ' , . * # & +
single character Am Pm Ch Display RAM 1302 is set with data from microprocessor 310 via serial input SIN to generate on screen displays using these sixty-four characters. Display RAM 1302 includes 240 memory locations for characters to be displayed on the screen of a television set 308 coupled to the present cable television terminal 300 of FIG. 3.

As shown in FIG. 3B, each memory location includes a parity bit, character color bits which determine the color of the character, a blinking bit (not shown) which determines whether the character is blinking, and a character code identifying one of the characters stored in ROM 301. The configuration or make-up of the on-screen display is shown in FIG. 3C and can be seen to consist of a maximum of ten rows of twenty-four characters each. This size display when viewed on a nineteen inch television set 308 may be easily read by a subscriber. The information in display RAM 1302 determines what appears at each of the screen positions 1–240. A typical on-screen display, OSD 8a, is found, for example, in FIG. 7A, which will be described subsequently in greater detail herein.

There are two modes of on-screen display. The first mode is a plain background mode and the second mode is an overlay mode. In the first mode, characters appear on a solid background. This mode is preferably used for message OSD's, for example, those represented in FIG. 11. In the second mode, She characters are overlaid on the video pattern from descrambling circuit 304 which is input to CVIN of on-screen display control circuit 306. The second mode may be used, for example, to display time, channel number, and a channel identifier as a subscriber tunes to different channels. Channel identifiers are described in commonly assigned copending application Ser. No. 07/800,002, entitled "Method and Apparatus for Displaying Channel Identification Information" filed Nov. 29, 1991 and incorporated herein by reference. It will be apparent that a system operator may utilize either mode to display information to subscribers and the present invention is not limited to categorizing which information is presented on a solid background or is overlaid onto a video signal.

Referring to FIG. 3D, the front panel of terminal 300 is shown to comprise a two digit display 322 for channel numbers, volume level, and diagnostics. Light emitting diode 321 determines whether the display is that of a channel number, for example, an unlit condition, or volume level, represented by a lit condition. Light emitting diode 320 flashes on and off as a message alert indication as will be subsequently described herein.

Below the digit/diode display, there is a terminal key pad representative of a key pad 311 shown in FIG. 3. The key pad comprises two way switches such that when the top of the switch is depressed, a digit key code is actuated, while when the bottom of the key is depressed, the indicated action by the respective labels are actuated. The CHAN key is used to precede a digit entry to indicate to the microprocessor 310 that digit entry and not, for example, the menu key is intended. After this key is depressed one or two dashes "——" appear in the LED display 322 to indicate that the terminal is awaiting digit entry. The top row of keys, the digit keys and CHAN key are preferably in color, such as orange, to differentiate the direct channel access feature from the other features accesible via the other keys.

Figure 3E:
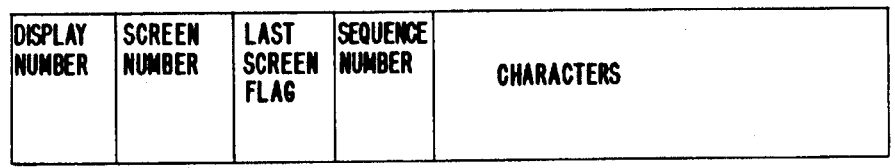
FIG. 3E provides details of a message transaction for downloading messages to the terminal of FIG. 3.

In accordance with the present invention, addressable messages may be forwarded to subscriber terminals in the cable system using message scrambler 104e. Messages may be recovered in accordance with a menu system as further described below. FIG. 3E illustrates a message transaction for forwarding characters to subscriber terminals. Each message transaction has a display number associated therewith. In accordance with a present embodiment, the display numbers may range from 0 to 65535, although the invention is not limited in this respect. Additionally, a subset of the display numbers, for example, from 0 to 7, are reserved for barker text downloaded by a scroll channel scrambler 104 as discussed in greater detail below. Each message may include up to sixteen screens, each screen having 240 characters (ten rows of twenty four character positions as described above). The characters for each screen are sent in up to eleven sequenced transactions, such as those illustrated in FIG. 3E. The transaction also include the display number, the screen number, and a last screen flag. If the message is less than 240 characters, fewer transactions need to be sent to complete the message. The message transaction shown in FIG. 3E may then also include a last transaction flag. As discussed in U.S. Pat. No. 5,058,160, if the transaction rate is 29 transactions per second, slightly more than three seconds are required to send eight full screen messages over the same message channel. Accordingly, the average wait to receive one of these messages will be 1.5 seconds.

There are one or more message channels in a cable system. The message channel utilizes one or more scramblers 104 with internal data RAM of microprocessor 208 which stores the message loop from headened controller 103 and retransmits the message constantly to the subscriber terminals under the control of microprocessor 212. The serial nature of the system is such that, as the number of messages in the message loop increases, the response time for a subscriber to receive a message increases. The number of messages that can be stored in a scrambler is limited by its internal memory size. If desired, additional message channels may be utilized to speed up the response time.

If MESSAGES is selected from the menu illustrated in OSD 8a of FIG. 7A, and no active messages are present for the subscriber, a screen such as illustrated in OSD 66a of FIG. 11 is presented. If MESSAGE is selected and a message is active for the subscriber, a WAIT screen such as OSD 53a of FIG. 11 is presented and remains until the message is found. As noted above, if there are eight full screen messages on the message channel, the average wait time will be 1.5 seconds. If there are 640 quarter screen messages, the maximum wait time is one minute.

The message transaction also permits a system operator to instruct on-screen display control circuit 306 to selectively blank the on-screen display on television set 308 until the entire message transaction is received and ready for display on the television set. Alternatively, on-screen display control circuit 306 may display the characters one at a time until the message is completed.

Figure 3F:
FIG. 3F provides details of a message definition transaction defining the messages downloaded to the terminal.

Referring now to FIG. 3F, there is shown a message definition transaction for particularly defining a message. This transaction indicates that a message has been sent to a subscriber terminal. The messages may be individually addressed or addressed to all members of a group, or even globally, as defined by the address data. A message definition transaction includes the display number for a particular address or for a group of subscribers as defined by the address data. It also defines the background color and where to tune for the message. The message characters may be found on the channel currently tuned, one of the message channels, the scroll channel, or the OFF channel, defined above. This data is stored in the RAM (not shown) of the subscriber terminal 300, for example, that associated with microprocessor 310. The message definition transaction is preferably sent on all the data streams defined above in order to most quickly inform the subscriber that he or she has a message.

Using a downloading transaction, a subscriber terminal 300 can be addressably assigned to one or more groups. In a preferred embodiment, 64 groups are defined, but the invention is not limited in this respect. The group assignments of a subscriber terminal are stored in non-volatile memory 314. When the subscriber terminal receives a message definition transaction which is addressed to it or to any group of which it is a member, a message alert may be provided. In order to obtain the message, data and control circuit 302 of the subscriber terminal tunes up/down converter 301 to the appropriate channel and searches for a message transaction with the same display number. In a preferred embodiment, the message characters may be found on the channel currently tuned, one of the message channels, the scroll channel, or the OFF channel. The message definition transaction of FIG. 3F is preferably sent on all datastreams output by headend controller 103 in order to most quickly inform a subscriber that they have a message.

Although multiple messages may be sent to a subscriber terminal, each subscriber terminal 300 only maintains one pending message definition transaction. This will be the message read by using the menu structure further described below. As long as messages are not read, the pending message definition can be updated as new message definitions are received. The priority of this update is in accordance with the display number in the message definition, such that for two unread messages, the lower display number is read first. A message that has not been read always has priority over a message which has been read.

The messages are stored in the on-screen display control memory and are volatile to removal of AC power. After exiting a message screen as per OSD 54a of FIG. 11, it is erased from the on-screen display control memory.

When a subscriber terminal 300 receives a transaction defining a message for that subscriber terminal, an alert occurs. For example, referring briefly to FIG. 3D, a segment 320 of an LED display may blink on and off and/or an on-screen display OSD 65a of FIG. 11 will be provided on associated television set 308. The message alert ends when the last screen of the message is received and if there are no more active unread messages for the subscriber terminal. If the transaction includes instructions enabling an on-screen message alert, an on-screen message alert such as OSD 65a of FIG. 11 will overlay the video until a key on the keypad 311 of the subscriber terminal 300 or of keypad 401 of a remote control is pressed. No alert can be given and no messages received if the subscriber terminal is not tuned to a channel with data.

When the message is displayed, it remains on the screen until the user changes the screen. If there are multiple screens, the subscriber may cycle through all message screens and back to the beginning as many times as desired by use of the SELECT key of the key pad of FIG. 5. At each new screen, there will be a waiting time. When the last screen of a message has been received, the message is defined in terminal memory as being read. After all active messages have been read, the messages can be reread.

Messages are transmitted for a period of time configured by the headend so that message channel data is minimized. An active message control transaction flagging all groups with active messages is sent periodically. This controls message expiration.

As noted above, a subset of the message transactions may be used for barkers to convey information to a subscriber. Barkers are used by a system operator to provide specific information to a subscriber concerning, for example, an inability to tune a particular channel. Such specific information promotes a user friendly interface with the subscriber.

Now, referring to FIG. 4, there is shown a block schematic diagram of a remote control device 312 according to the present invention for controlling operation of the cable television terminal 300 of FIG. 3. A key pad 401 is provided or other input device for user entry of commands and data. Upon actuation of a key, crosspoints of a, for example, four by six matrix are crossed. Control circuit 402, which may be a microprocessor or an application specific integrated circuit, periodically scans the key pad matrix for key actuation. The control circuit may preferably comprise an N.E.C. MPD6108C-024, a sixteen pin DIP integrated circuit, known in the art. This integrated circuit comprises memory for storing debouncing software routines for protecting against inaccurate scanning of key actuations. The control circuit automatically corresponds a key actuation with a data byte of six bits, uniquely representing the key that was actuated. Altogether, a preferable data transmission format comprises twenty-two bits including the key code and a control code. The twenty-two bits further include redundant key codes and control codes and are preferably preceded by a head or start code. The data signal modulates an infrared signal (for example, by pulse position modulation) at, for example, 59.6 KHz for transmitting key code data to the remote receiver 315 of the cable television terminal 300 of FIG. 3 via diode 405 and diode driver transistor 403. Driver transistor 403 may conveniently comprise a Toshiba 2SC2710Y or other suitable driver transistor and infrared diode 405 may conveniently comprise an N.E.C. SE303AY or other suitable diode.

A maximum possible eight bit key code comprises two hexadecimal digits, which altogether represent 256 possible combinations of data. Only twenty-four keys, and so twenty-four key codes, are used for one embodiment of a key pad for remote control 312. Consequently, there are spare codes that may be used for control, some of which may be secret to a user and not actuable from their keypad. A cable television repair person may be equipped with a remote control device capable of transmitting these otherwise secret codes. Equipped with such a device, the repair person gains access to a terminal's processor memory for running diagnostic programs of the cable television terminal 300 of FIG. 3.

Referring to FIG. 3, actuation of a key of key pad 401 of FIG. 4 causes a modulated infrared light signal to be received at remote receiver 315 from IR remote 312. Microprocessor 310 interprets the key actuation in view of control software represented by the respective bubble diagrams of FIGS. 6, 8, 10, 12, 14, 16A, 16B, and 18, as will be subsequently described herein. Depending on the state of terminal 300 represented by the state diagrams, actions are taken shown as outputs of hexagonal boxes representing named keys which have been actuated. By way of example and referring to FIG. 6, from the On mode represented by the bubble 603 in the middle of the state diagram, actuation of practically any one of keys of the key pad of FIG. 5 will be recognized by microprocessor 310 of terminal 300. The actuation of the several keys of this key pad or the terminal key pad are represented by the hexagonal boxes labeled, DISP (Display); POWER; MENU; Vol+, Vol−, Mute (which actually are three different keys of the key pad of FIG. 5); CHAN (for channel entry from the terminal key pad 311); CH+, CH− (which actually represent two different keys); the digits 0–9 (which represent ten different keys); SLEEP; FAV (for Favorite); LAST; and a timeout for terminating display of the channel identification screen overlays described above.

Figure 5:
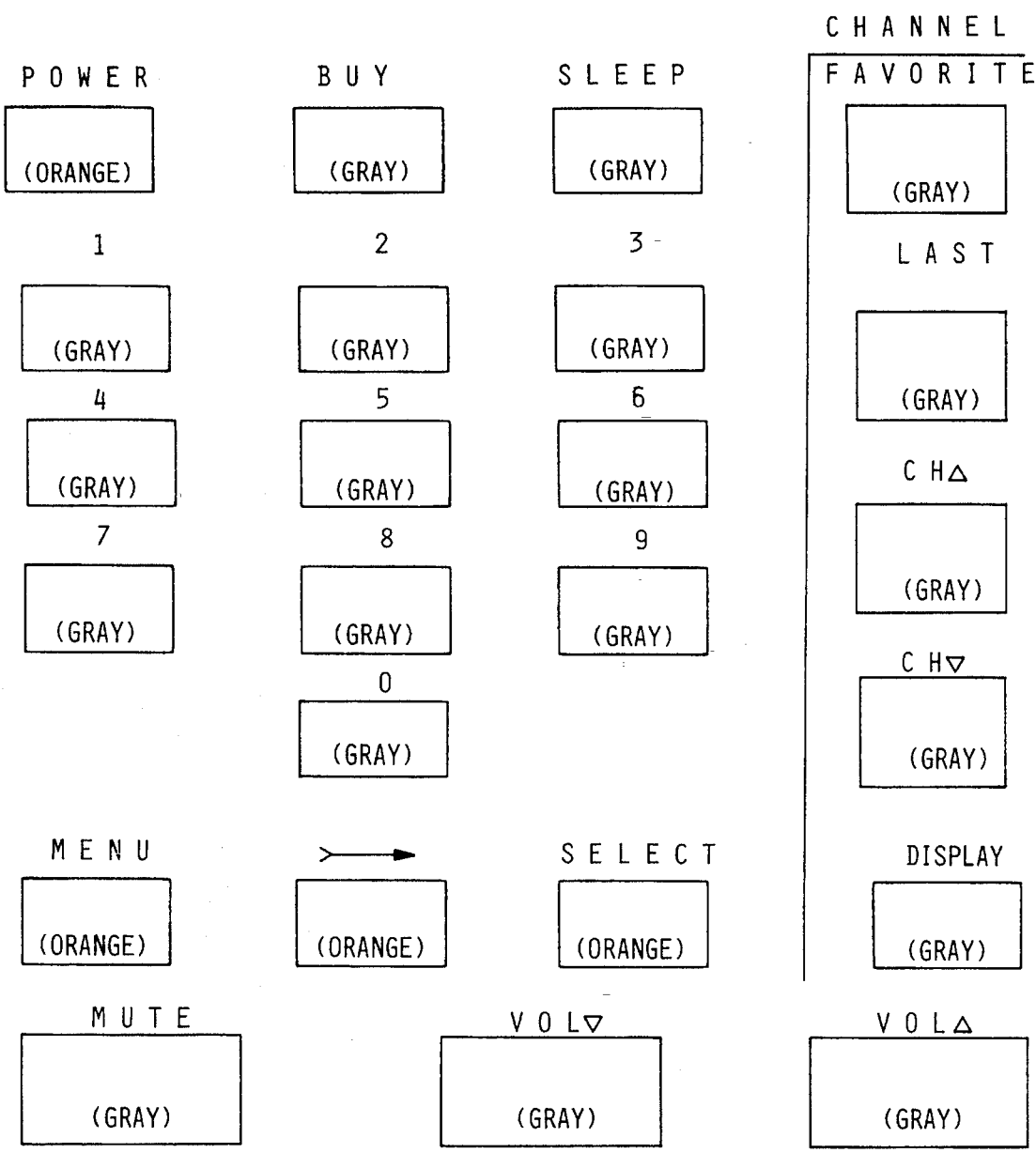
FIG. 5 is a key pad layout for a user input device according to the present invention for use in the remote control device of FIG. 4.

Referring now to FIG. 5, there is shown a typical key pad layout according to the present invention for the key pad 401 of FIG. 4 for the remote control 312 of FIG. 3. The keys of key pad 401 are organized into groups. In the upper left is an orange POWER key, so placed and colored for ease of access to the user. The POWER key toggles the powering up of the cable television terminal of FIG. 3. Just to the right of the POWER key are the BUY key and the SLEEP key.

When the terminal of FIG. 3 is in the On mode and tuned to a pay-per-view channel showing an event with its purchase time window open, the user by actuating the BUY key initiates a buy sequence. Consequently, this key is used to purchase an event. Referring to FIG. 6E, buy alert screens OSD 5a and OSD 5b overlay the tuned channel with the pay-per-view event during free time, for example, for fifteen seconds of display followed by fifteen seconds of non-overlaid video. If the sleep timer is set, then OSD 5b is displayed to show the remaining sleep timer setting. When free time expires, a help barker channel may be tuned.

Actuating the BUY key begins a purchase sequence. A secret access code is provided to a user and downloaded to the terminal 300 NVM 314. Referring to FIG. 6F, the impulse pay-per-view number is entered one digit at a time. As numbers are entered, a "−" turns to a shaded box, for example. The code is checked with the code stored in memory. If correctly entered, the subscriber is asked to press the BUY key again per OSD 7a and the subscriber is thanked per OSD 7b.

In other features besides pay-per-view, the BUY key may be used for home shopping, airline ticket purchase and such and still have the identical function, i.e. to initiate a buy sequence.

The SLEEP key also may be actuated from the On mode. The SLEEP key when actuated directly accesses a sleep timer feature which will appear as a textual overlay on the transmitted video signal. Referring to FIG. 6D, at the first press, if the timer is not set, OFF is indicated on the display opverlay as per OSD 4a. If the timer is active, at the first press, the remaining sleep timer setting will appear as per OSD 4b. The second actuation of the SLEEP key increments the sleep timer, for example, to the next highest set time value allowable according to a predetermined sequence of set timer settings as will be further described below.

The sleep timer feature is also accessible through the main menu as will be described further herein in connection with the following discussion of FIGS. 6 and 8.

The POWER, BUY, and SLEEP keys are grouped together at the top of the key pad because of their importance and similarity as function or feature keys. The BUY and SLEEP keys may be colored in a less attention-getting color than orange such as gray.

Just below these function keys are a group of ten digit keys representing the digits 0 to 9. These may likewise be the same color as the BUY and SLEEP keys. The digit keys, when the terminal is in the On mode of FIG. 6 and within menus requesting channel numbers, are actuated for entry of channel numbers. During parental guidance control number and pay-per-view access number entry, the digit keys are actuated to enter these respective codes. The digit keys (0–9) are grouped together for ease of access. A user preferably should be able to feel or sense where the digit keys are located and use them from memory. Consequently, the digit keys may be most conveniently arranged in the manner of a telephone key pad, a two dimensional three column by four row matrix.

To the right of the digit and POWER, BUY, SLEEP function key groupings are a vertically arranged group of five labeled CHANNEL keys. These may also be gray in color but may be differentiated as a key group by a partial or full line box. At the top of the list of linearly arranged channel keys and just below the CHANNEL label is the FAVORITE key. The FAVORITE and other CHANNEL keys are so-labeled and arranged to suggest to the user a complete name and function of a key, for example, FAVORITE CHANNEL, LAST CHANNEL, and DISPLAY CHANNEL.

The FAVORITE key is a key previously labeled the RCL key, or recall key, in the known Scientific-Atlanta Model-8590 cable television terminal. When the terminal is in the On mode and the FAVORITE key actuated, the microprocessor 310 recalls the next favorite channel in a list of favorite channels the user has established in terminal memory and causes demodulating and descrambling circuit 304 to tune to that channel.

Figure 6:
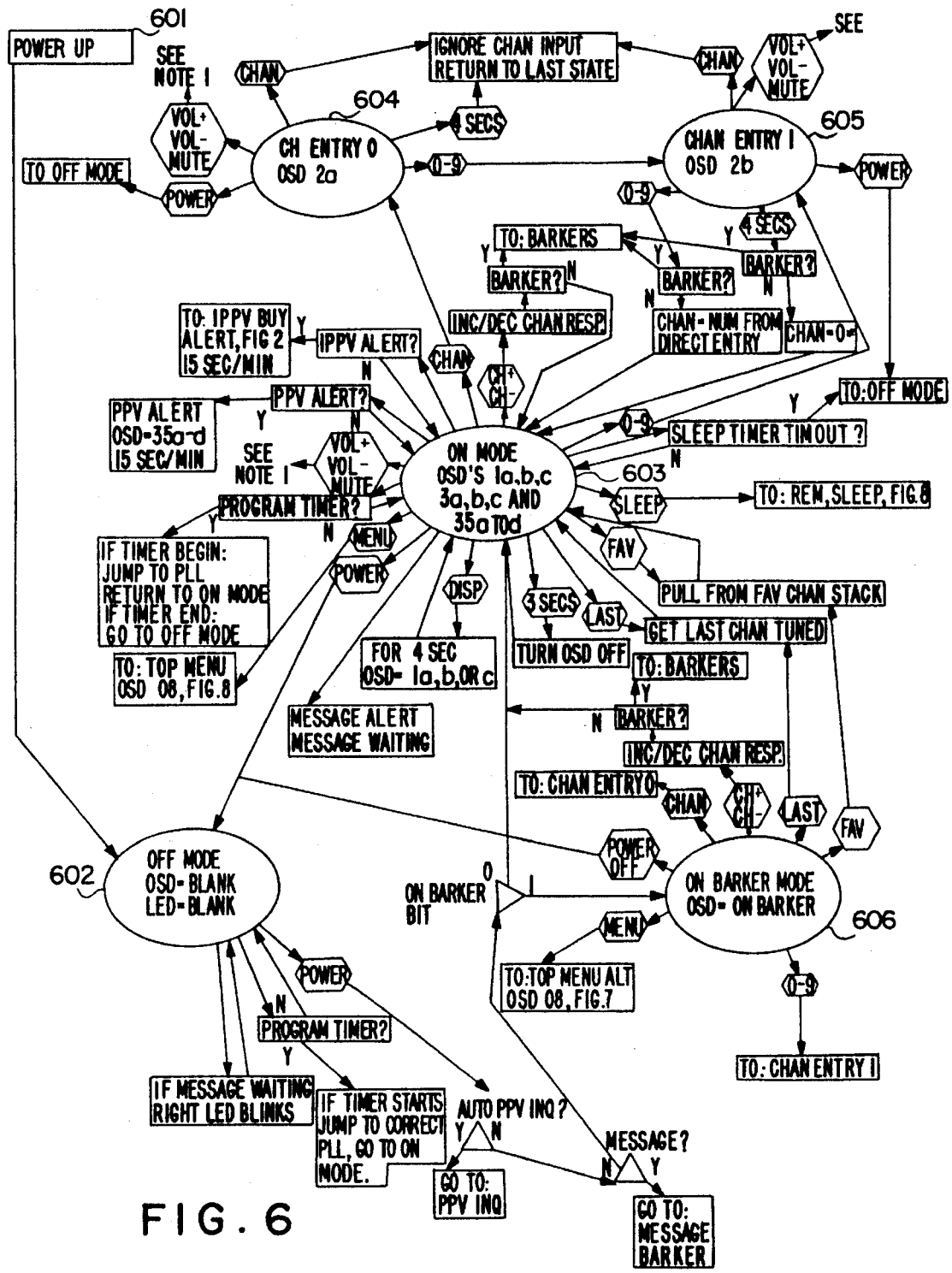
FIG. 6 is a master state diagram for the cable television terminal of FIG. 3, each bubble representing a mode or state of the terminal, each box representing an action of the terminal and each hexagonal box representing actuation of a key of the terminal key pad 311 of FIG. 3 or the remote control key pad 401 of FIGS. 4 or 5, FIG. 6 showing entry into a main menu for terminal initialization according to the present invention.

The LAST key is used in the On mode shown in FIG. 6 of the terminal 300 to toggle between the last two previously viewed channels. In other words, a user may toggle, for example, between a sporting event and a movie by repeatedly actuating the LAST key. Microprocessor 310 gets the last channel tuned from memory each time the key is actuated and appropriately actuates demodulating and descrambling circuit 304 to tune respectively to the two channels showing the sporting event and the movie as the key is actuated.

The CH+ and CH– keys are situated just below the FAVORITE and LAST keys, the CH+ key above the CH– key because that is the way a user would expect to find them. When the terminal is in an On mode, again referring to FIG. 6, microprocessor 310 responds to actuation of the CH+ or increment key by incrementing to the next channel number and signals demodulating and descrambling circuit 304 to tune to that channel, regardless of the favorite channel list. The CH– or decrement key is used in a similar manner to decrement the channel number of the tuned channel. A user will easily associate an incrementing process with a higher position and a decrementing process with a lower position on a key pad. Access to any cable television channel then may be obtained by these keys or, alternatively, by accessing a channel directly through the digit keys (0–9) from the On mode.

Referring to FIG. 6B, there is shown OSD 2a for direct channel access. When the CHAN key of key pad 311 is actuated, a "–" appears and the left dash flashes to request entry of the first digit. OSD 2a is represented by bubble 604 on FIG. 6. Then, per OSD 2b, the right dash flashes to request entry of the second digit after the first digit is entered. OSD 2b is represented by bubble 605 on FIG. 6. The last screen OSD 2c is provided to show the on-screen display if a two times normal size global transaction, discussed subsequently herein, has been downloaded into terminal NVM 314.

In a menu which asks for a parameter value change, the CH+ and CH– keys are used to increment or decrement respectively the value of the parameter. These parameters include but are not limited to the following: program timer entries, favorite and parental control entries, and sleep timer times.

When the increment or decrement keys are held down, and because of the large number of channel numbers accessible to a user, the rate of channel change may be varied. For example, the channel change rate may be predetermined at only twice-per-second for two changes and then increase to a six-per-second channel change rate thereafter. The twice per second rate allows a user to view the next two channels to make a conscious decision as to whether they are interested in the content. The faster six-per-second rate moves the channel tuner quickly, for example, to within ten digits of a desired channel. The user then can release the increment or decrement key and more slowly change the channel to their desired channel.

The DISPLAY key is the last of the channel grouping of keys and is the subject of U.S. patent application Ser. No. 07/800,802 entitled "Method and Apparatus for Displaying Channel Identification Information" filed Nov. 29, 1991 of the same assignee. Referring to FIG. 6A, the DISPLAY key in the On mode of the terminal actuates an on-screen display OSD 1a of the current time, the channel number, and a program identification (PID), identifying a program, channel or station, for example DISN for Disney, to overlay as text on the viewed video channel for four seconds. The first line of the display may be made to be twice the normal height and width as per OSD 1b of FIG. 6A. Headend controller 103 downloads a global command to NVM 314 to actuate on-screen display controller 306 accordingly. If the sleep timer is set, the remaining sleep time on the sleep timer may also appear as per OSD 1c of FIG. 6A.

At the bottom of the key pad 401 appear a group of three horizontally arranged keys related to controlling the audio portion of a program. The left most key of this horizontal row of three keys is the MUTE key. In any terminal mode (On or Off) according to FIG. 6, the MUTE key toggles the volume between mute and a preset level according to the level set by the VOL+ and VOL− keys hereinafter described.

Referring to FIG. 6C, there are shown three different on-screen displays for volume control. According to OSD 3a, there is shown a low volume level as indicated by a heavy horizontal line. LED display 313 shown in FIG. 3D reads 3.7. For an optimum stereo indication, a 4.5 indication is provided by LED display 313 and OSD 3b of FIG. 6C reads BEST Stereo with an arrow pointing upward to the level marker. According to OSD 3c, the volume marker remains at the level established by the subscriber, but the volume is muted. Furthermore, the LED display 313 Will read "0.0."

In any mode, On or Off, the terminal volume may be set using the VOL+ and VOL− by incrementing or decrementing a visually displayed range, for example, 00–63. An on-screen display is provided to indicate an optimum level, for example, 45 for left and right channel stereo separation as first taught in Kinney C. Bacon U.S. Pat. No. 5,054,071, which issued Oct. 1, 1991, and is incorporated herein by reference. The volume display may remain lit for three seconds, less than the four seconds for the on-screen display actuated by the DISPLAY key. There is less time required for a user to assimilate the displayed information actuated by the volume keys.

The VOL+ key is situated to the right of the VOL− key because a user generally perceives a right-most indication as a positive indicator and a left-most indication as a negative indicator. The VOL+ and VOL− keys, being at the lower right of the key pad of FIG. 5, are easily felt and located by a user of the key pad. All three volume keys, being in a horizontal row and segregated from other keys may be gray in color.

Also, if the volume has been muted by actuating the MUTE key, actuating the VOL+ or VOL− keys will toggle the volume state back to its previous volume level. Unlike the MUTE key, however, the volume will then begin to be incremented or decremented as the VOL+ or VOL− keys are held down. Like the CH+ and CH− keys, it may be appropriate to vary the rates of change of the volume levels especially in regard to the decrement key, when a user may wish to use VOL− as if it were a MUTE key.

The last grouping of keys relates to terminal set-up or initialization and is the subject of the method of terminal initialization according to the present invention. The three terminal set-up keys are used the least and may be the most difficult to locate. They are most conveniently colored the same color as the POWER key to gain attention as a grouping of keys. In an alternative embodiment, these keys may be boxed like the CHANNEL key vertical row. Preferably, however, by being a separate color, these keys are easily differentiated from the volume keys below, the digit keys above, and the boxed channel keys to the right.

This key grouping comprises a MENU key, a right-pointing arrow labeled key, and a SELECT key. The MENU key is used when the terminal is in the On mode to access the on-screen menu structure of menus and sub-menus as will be described in greater detail herein. From within any menu, actuation of the MENU key causes the terminal to cancel the set-up activity. The MENU key is thus used to escape from any of the feature-access menus. Actuation of the MENU key generally returns the terminal to the normal viewing mode after saving in terminal memory any items that were changed during the menu sequence. Occasions when the MENU key is not usable as an escape from the menu structure are during channel, parental control code, and pay-per view access code entry.

The right-pointing arrow is shown on the key pad 401 of FIG. 5 to be identical and symbolic of an on-screen display arrow icon. The on-screen display arrow icon then becomes a cursor and the arrow key its control. Choices on a particular menu or sub-menu are conveniently limited according to the principles of the present invention. The arrow moves in one and only one convenient direction through the choices. For example, the arrow moves down a left-most vertical list of choices one item at a time. Then, the arrow moves to the next column to the right and moves down that column one item at a time and so on. In an alternative embodiment, the arrow icon may be moved from left to right across a top-most row and then to the next lower row and so on. In any embodiment of the present invention, the arrow preferably moves in one, and only one, predetermined direction through a multi-dimensional matrix of choices.

The right-most key of the three initialization keys is the SELECT key. The three initialization keys are arranged in the sequence of steps for initializing the terminal. The left-most MENU key accesses the set-up menu structure, the next key, the arrow key, takes the user through the available choices, and the right-most SELECT key actuates a selection of the choice proximate to the arrow, and so the process may continue. That is, when the terminal is in an On mode and in an on screen menu according to FIG. 7A, 13A, 15A, 17A and so on, actuation of the SELECT key either determines the choice pointed to by the arrow or initiates an action defined on the screen next to the arrow.

In summary, then, the key pad 401 comprises a minimum number of key groupings all having predetermined relationships and relative ease of access. Color, the use of boxes, and grouping of keys in predetermined sequences or relationships promote ease of access to the user. Yet, the number of keys is kept to a minimum of 24 in five predetermined groupings, function keys, channel keys, volume keys, digit keys, and initialization keys.

Referring to FIGS. 6–20, there are provided a series of state diagrams for the states of subscription television terminal keypad 311 or 401 followed by their associated on-screen displays (OSD). Boxes of the state diagrams represent terminal actions. Hexagonal boxes represent actuation of keys of remote key pad 401 or terminal key pad 311. Bubbles of the state diagrams represent modes or states of the subscription television terminal 300 of FIG. 3. The screen numbers in the bubbles correspond to associated on-screen displays (OSD's) which are generated for display on an associated television set 308. These OSD's show the actual text and attributes of the screens displayed.

Referring first to FIG. 6, there is shown at the upper left a box 601 representing the action of the terminal in powering up. When power is first applied to the cable television terminal 300 of FIG. 3, that is the terminal is plugged into a wall power outlet, the terminal runs several self-diagnostic programs to initialize itself into a predetermined condition and then enters an OFF mode, represented by bubble 602. The OFF mode bubble 602 represents a state wherein there is no on-screen display provided and the LED display of the terminal is likewise blanked. If the POWER key is actuated and there is no pay-per-view inquiry, the terminal seeks to determine if there are messages waiting for the user. If not, a barker "on" bit of terminal memory is regarded and if 0, finally, the ON mode, represented by bubble 603 is entered. The ON mode is represented by bubble 603 in the center of FIG. 6.

If the barker "on" bit is 1, then, the On barker bubble 606 is entered and the on-screen display is the barker channel. From this state, the terminal microprocessor looks for entry of a channel to tune from the barker channel to a program channel.

If from the On mode, the SLEEP function key is actuated, the sleep timer OSD 14*a* or 14*b* of FIG. 9 is displayed via on-screen display controller 306 via modulator 307 on television set 308. Control for displaying OSD 14 is handed from FIG. 6 to FIG. 8. In this manner, the user of the present invention may directly access sleep timing as will be further described herein.

Figure 7:
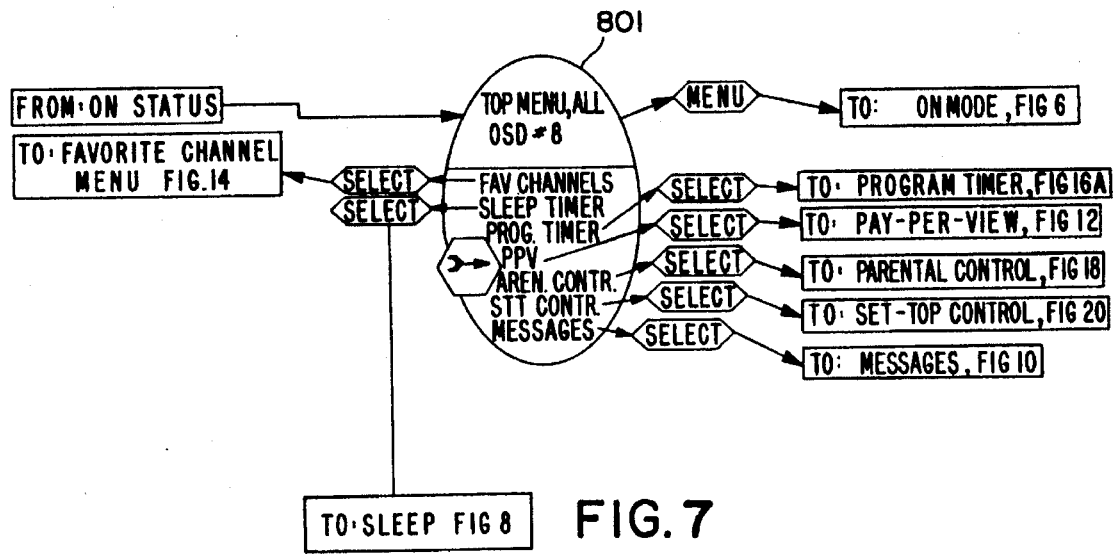
FIG. 7 is a state diagram for the main menu of FIG. 7A.

From the ON mode bubble 603, if the MENU key is actuated, the terminal enters the main or top menu OSD 8 represented by bubble 801 of the state diagram of FIG. 7. Likewise, depending on the cable television terminal's features, one of the top menu on-screen displays 8*a*, 8*b*, 8*c*, or 8*d* of FIG. 7A will be output from the on-screen display controller 306 of the terminal of FIG. 3 for display on an associated television receiver 308. OSD 8*a* represents a complete main menu. If no parental control, then OSD 8*b* is an appropriate menu. If no timer or parental control, then OSD 8*c* is an appropriate menu. Without favorite channels, then, only four selectable items are displayed on OSD 8*d*. According to the principles of the present invention, instructions are provided at the bottom of each and every OSD accessible from the top menu to assist the user. In the instructions, references to keys are appropriately emphasized, for example, by the use of brackets surrounding the key name or label. For example in OSD 8*a*, the SELECT key and MENU key labels are bracketed to get a user's attention.

Referring now to FIG. 7, there is shown a state diagram for the main or top menu of FIG. 7A. From the OSD 8 bubble 801, one selects via actuation of the SELECT key after moving the cursor arrow icon to the desired choice with the right-pointing arrow key on the entries of the main or top menu. Thus, the SELECT key is sensed, associated with a choice by microprocessor 310 and appropriate action taken according to the bubble diagram. As shown control is transferred to FIGS. 8, 10, 12, 16A, 18, or 20 depending on the choice selected.

Figure 8:
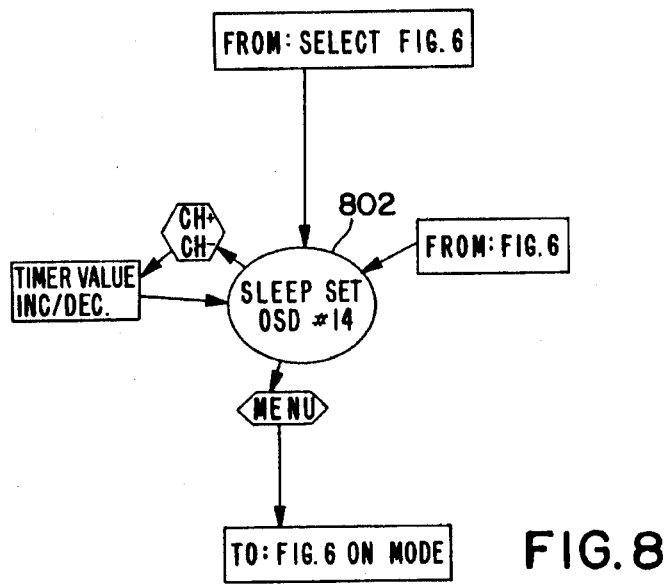
FIG. 8 is a state diagram for sleep timing and for actuating its associated on-screen displays.

By way of example, if the user actuates the choice "sleep timer," then, control is transferred to FIG. 8. Per FIG. 8, OSD 14 is displayed as per sleep set bubble 802 and either OSD 14*a* or 14*b* of FIG. 9 displayed. Referring to FIG. 9, either depicted OSD provides the user with instructions. Using the increment or decrement keys CH+ or CH−, the user is provided with the choices of a desired sleep time or off, for example, OFF, 15, 30, 45, 60, 90 and 120 minutes. Referring briefly to FIG. 8, microprocessor 310 looks for entry of the new sleep timer value via the increment and decrement keys and stores the last entered value in terminal memory.

In an alternative embodiment and in accordance with a principle of the present invention to avoid use of multifunction keys such as increment and decrement, all seven choices may be presented on the screen, the right-pointing arrow key and the SELECT key may then be used to select the desired sleep time or Off setting in stead of the CH+ and CH− keys.

A user, for example, who wishes to watch a late night movie refers to a program guide for determining when the movie is over and calculates the remaining viewing time. They then set the sleep timer appropriately to, for example, sixty minutes, and return to normal viewing. Even if they fall asleep, the television set, after sixty minutes will be turned off via the switched power outlet of the cable television terminal of FIG. 3. After four seconds, if no change is made to the sleep timer of OSD 14, the display disappears and the sleep timer is set in terminal memory to the last displayed value. Also, after turning the terminal Off, i.e. entering the Off mode bubble 602 of FIG. 6, the terminal returns the sleep timer in memory to the Off condition.

Figure 10:
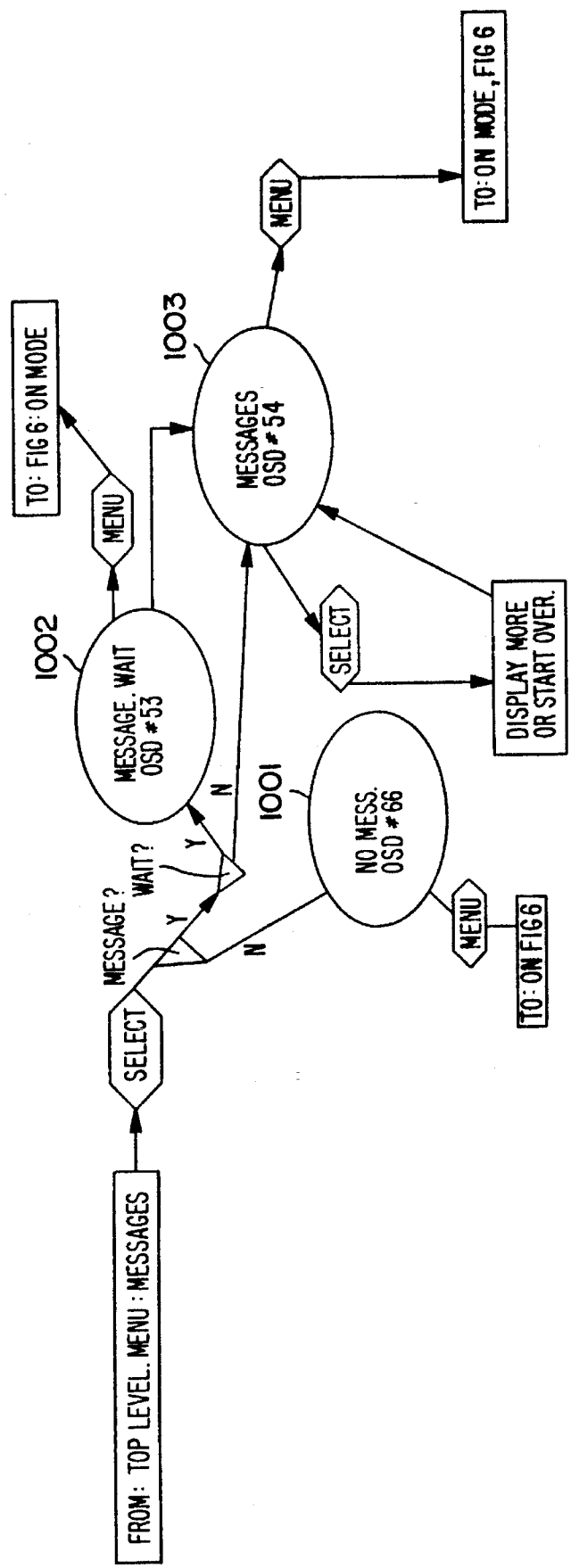
FIG. 10 is a state diagram for the message sub-menu structure of the main menu of FIG. 7.
Figure 20:
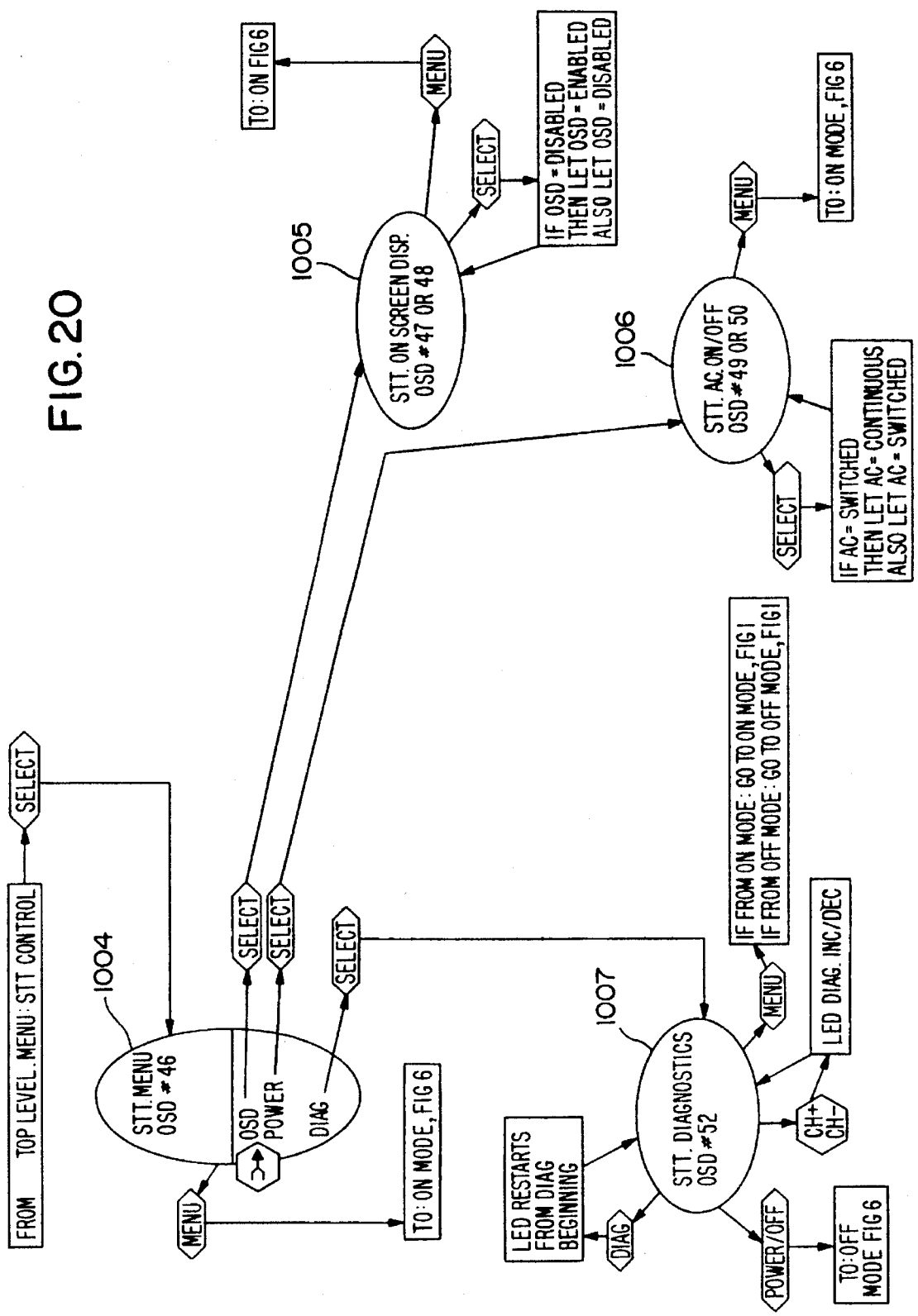
FIG. 20 is a state diagram for the subscription television terminal control sub-menu structure of the main menu of FIG. 7.

Referring again to FIG. 7, if Messages is selected with the SELECT key, then the state diagram of FIG. 10 is entered. The top portion of the state diagram of FIG. 10 represents the messages sub-menu structure. If set top terminal (STT) control is selected then control is transferred to FIG. 20. FIG. 20 represents the set top control sub-menu structure.

Referring to FIG. 11, there are shown on-screen displays 53*a*, 54*a*, 65*a*, and 66*a* for the messages sub-menu structure. Again, referring to FIG. 10, once messages is selected with the SELECT key, the terminal must check the status of messages. If there are no messages, then, the no path is taken to OSD66 bubble 1001. If one is waiting, then OSD 53 is shown via bubble 1002. When the message arrives, OSD 54 is shown per bubble 1003. If the message is already stored in the terminal and there is more than one screen of messages, then repeated actuation of the SELECT key causes all message screens OSD 54 to be displayed. Referring briefly to FIG. 6, message alert OSD 65*a* is used to alert a user of the terminal during the On mode from bubble 603 of a message alert of a message as described above.

Figure 12:
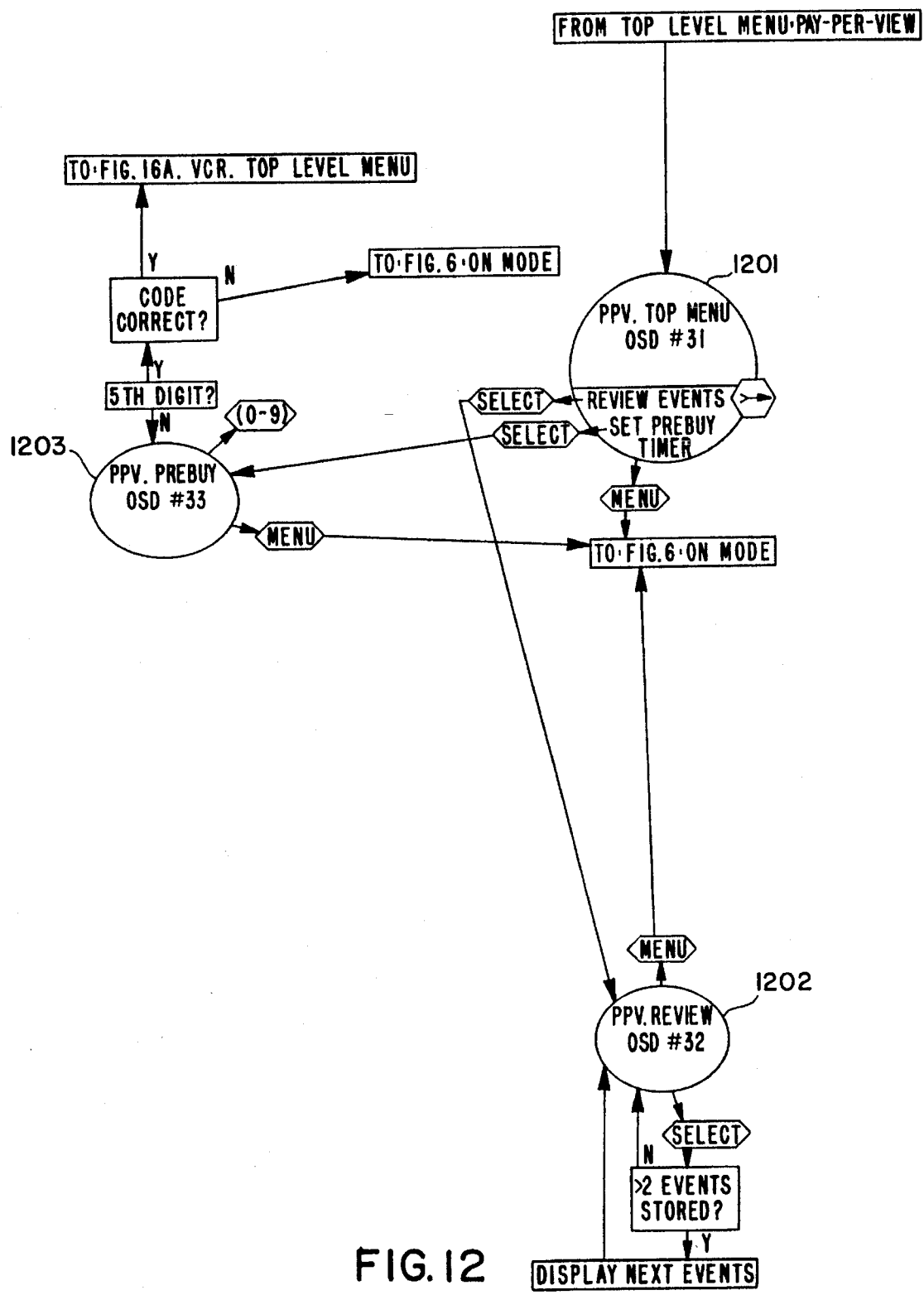
FIG. 12 is a state diagram for the pay-per-view sub-menu structure of the main menu of FIG. 7.

Referring to FIG. 12, there is shown a state diagram for the pay-per-view sub-menu structure when pay-per-view is selected. Referring to FIG. 13A, OSD 31*a* is exemplary of the first pay-per-view sub-menu displayed at bubble 1201. There are two choices presented: review one's currently authorized events or set a program timer for an event. If the terminal does not have so-called impulse pay-per-view when a user can choose an event on impulse without its prepurchase from a cable television service operator, then OSD 31*b* is shown. On either on-screen display, instructions are provided at the bottom to assist the user.

OSD's 32*a*, 32*b*, 32*c*, and 32*d* show possible states of having selected the choice of reviewing one's currently authorized pay-per-view events as per bubble 1202. OSD 32*a* shows no events; OSD 32*b* shows one or two events; OSD 32*c* shows use of the SELECT key to view three or more events. When program event data has not been downloaded into terminal memory from the headend, the OSD 32*d* only shows the channel numbers without an event number or title.

If, according to FIG. 12, setting a program timer is selected, then OSD 33, for example, OSD 33*a* of FIG. 13B is displayed per bubble 1203. Referring to FIG. 13B, one is requested to enter their pay-per-view access code. Digit keys of the digit key grouping of the key pad of the terminal or remote control are then actuated in sequence until five digits are sensed as having been entered. The entered code is compared according to FIG. 12 and, if inaccurate, the terminal is returned to the On mode. If the code is accurate, the user can proceed to set a VCR program timer according to FIG. 16A, for example, if they wish to record a future pay-per-view event on their VCR.

Referring to FIG. 13B, OSD 35 is entered when the terminal recognizes a pay-per-view alert in the On mode as shown in FIG. 6. It appears as already described for fifteen seconds on and fifteen seconds off. OSD 34 is entered according to FIG. 16B either from OSD 23 or OSD 24.

Figure 14:
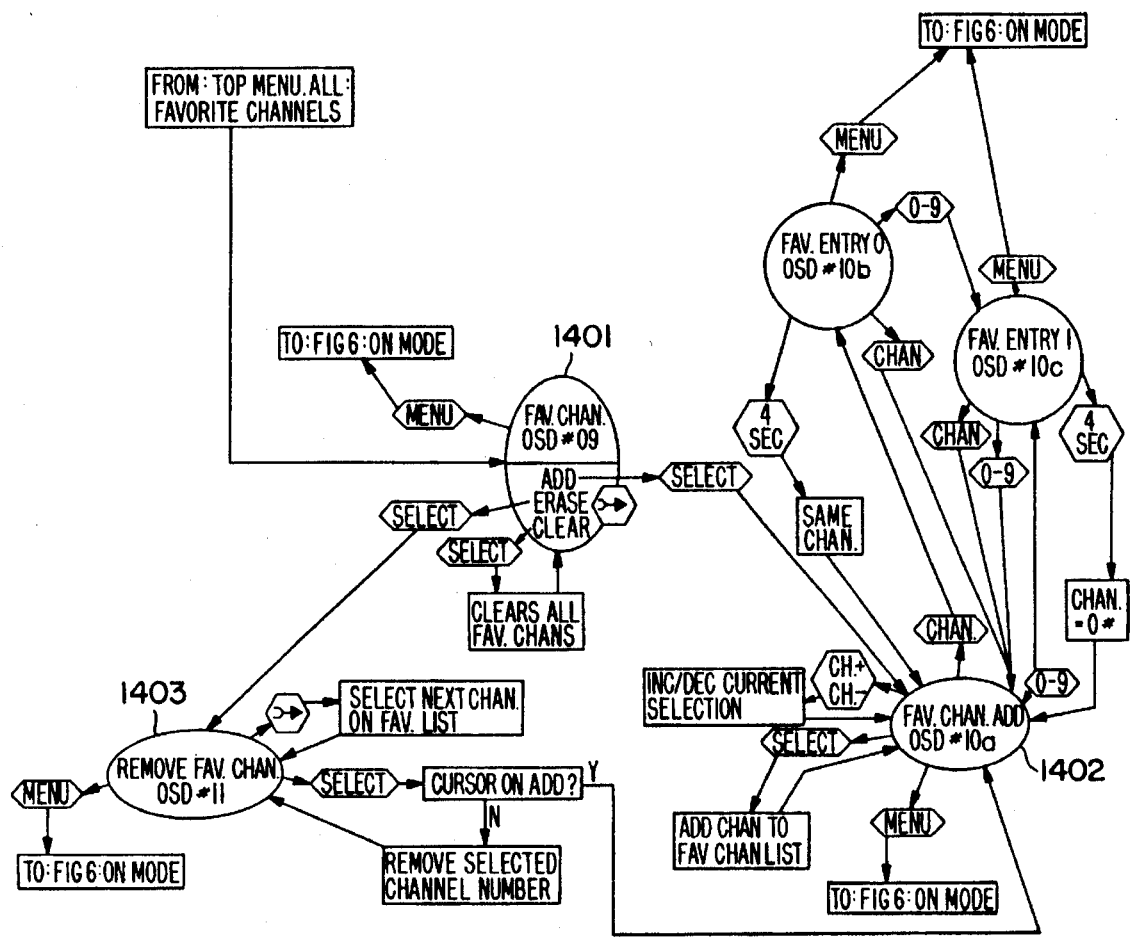
FIG. 14 is a state diagram for the favorite channels sub-menu structure of the main menu of FIG. 7.

FIG. 14 relates to the selection of favorite channels from the main menu OSD 8*a* of FIG. 7A. The first on-screen display bubble 1401 shown is OSD 9, three versions of which are shown in FIG. 15A representing situations when there are some empty slots, OSD 9*a*; no slots filled (the memory has been cleared), OSD 9*b*; or the favorite channel menu is full, OSD 9c. For example, fifteen favorite channels may be saved in a favorite channel memory, and in OSD's 9a and 9c, one possible choice is to remove a favorite channel from memory or to clear all channels, returning the memory to empty and the menu to OSD 9b.

From OSD 9, according to FIG. 14, if add is selected then OSD 10 is displayed per bubble 1402. Versions of OSD 10 are shown in FIG. 15B. Channels are added to the end of the displayed list and cannot be added to a full list. If clear is selected at bubble 1401, then, the channel list is cleared and OSD 9b is displayed. If remove (erase) is selected, then, the bubble 1403 for OSD 11 is entered and OSD 11 displayed as per FIG. 15C.

When the add mode is selected the currently tuned channel is displayed as a starting point as the last item of the list. For example, according to OSD 10a of FIG. 15B, currently tuned channel 42 blinks. The increment or decrement key is used to pick a different favorite channel which is added to the list with the SELECT key. One can also directly access a channel for storage in favorite channel memory of terminal 300 by using the digit keys as represented by OSD 10c. OSD 10b relates to actuation of a favorite channel using terminal key CHAN of keyboard 311, not necessary on the key pad 401.

Referring to FIG. 15C, any channel on the favorite channel list stored in terminal memory may be removed. The right-pointing arrow key moves the arrow icon through the list to the channel to be removed. The SELECT key is used to remove the desired channel from the list. OSD 11c shows an on-screen display for the condition when one has removed all channels from the list and a selection is provided to the user to add a channel or actuate the MENU key to exit. The add a channel selection is also available in OSD 11a, when there are slots available.

Figure 16A:
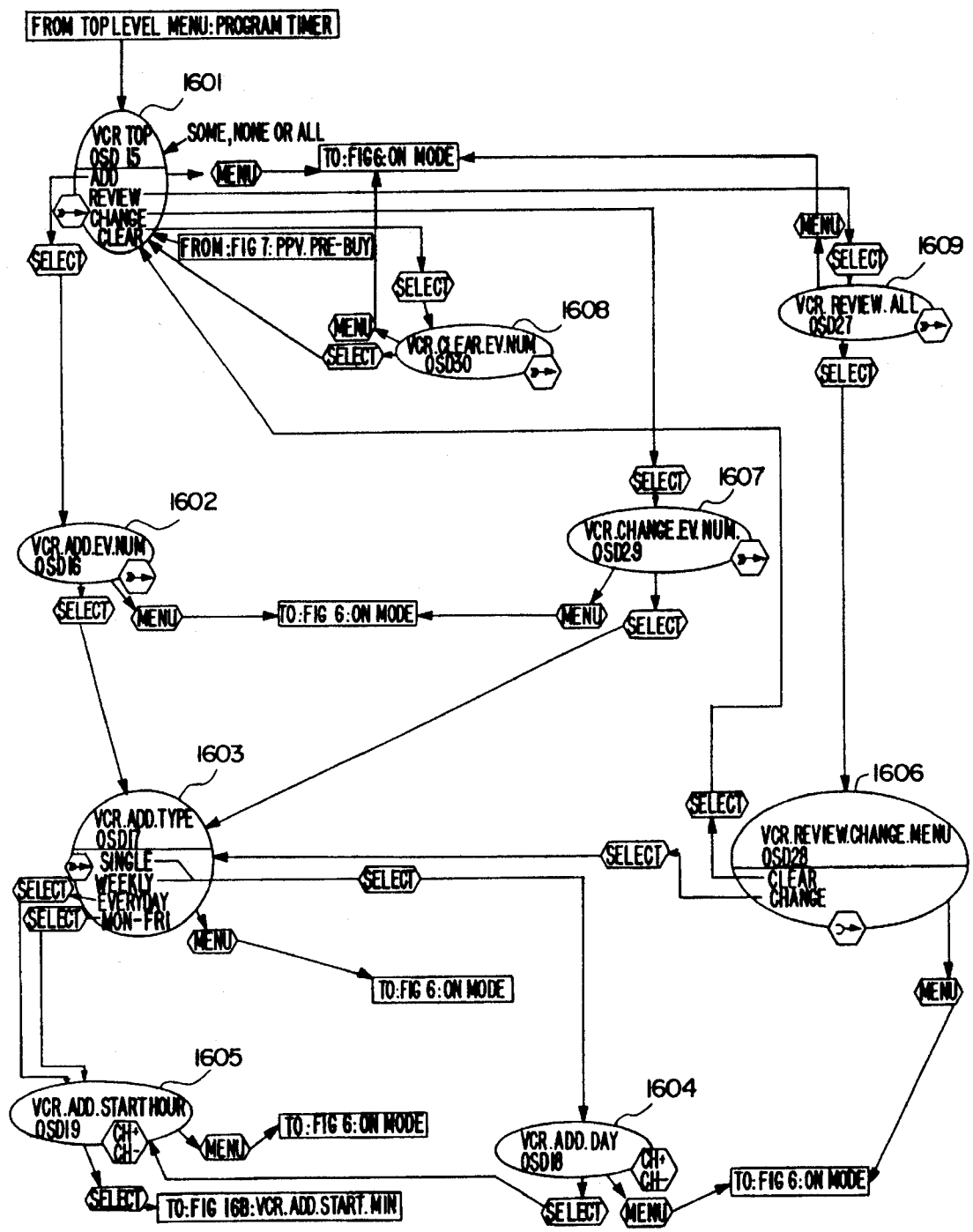
FIG. 16A is a state diagram for the program timer sub-menu structure of the main menu of FIG. 7.
Figure 16B:
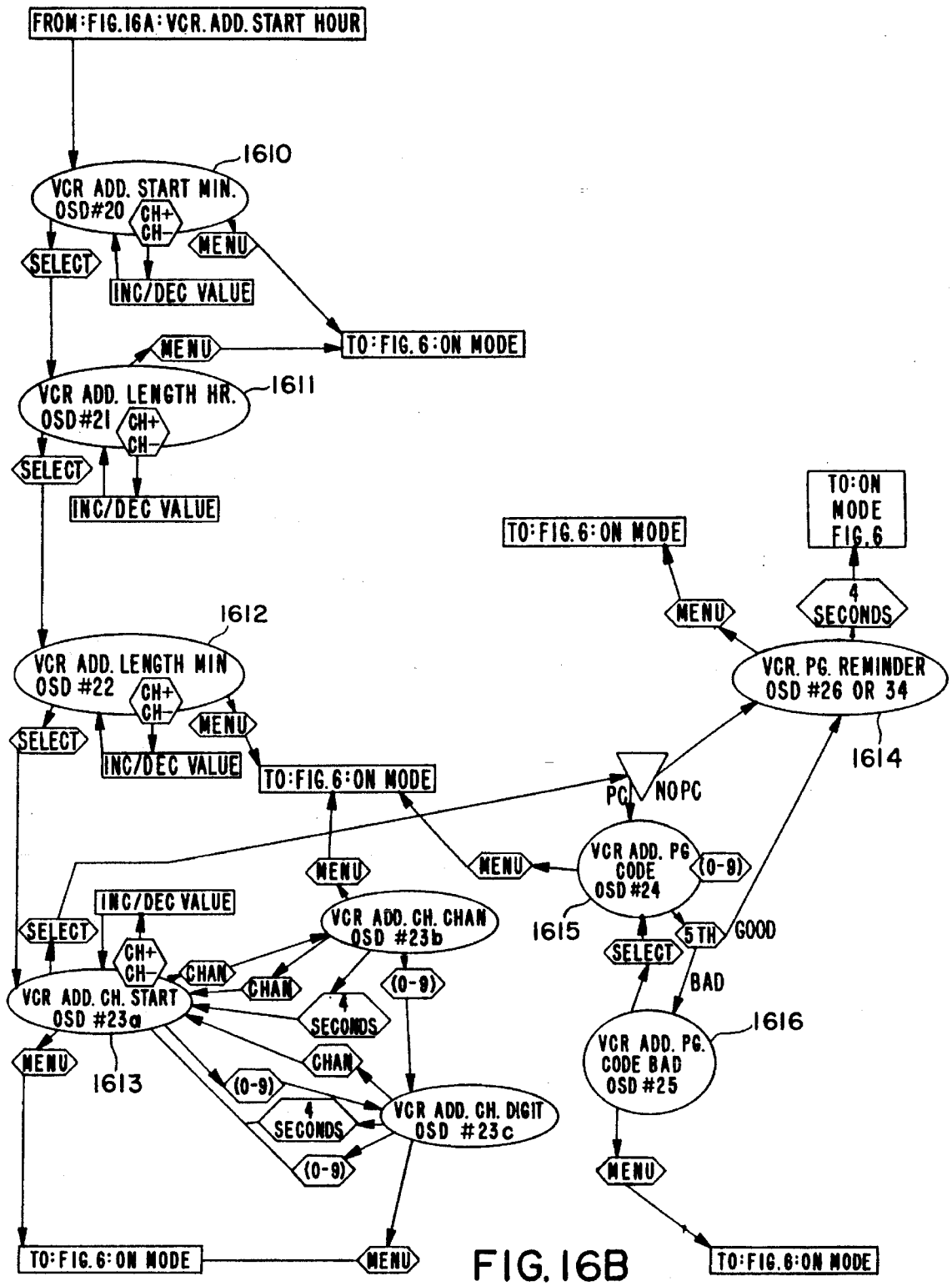
FIG. 16B is a further state diagram for the program timer sub-menu structure of the main menu of FIG. 7.

Now referring to FIGS. 16A and 16B, there are provided state diagrams for setting a VCR timer. The choices provided by the top VCR screen OSD 15 represented by bubble 1601 are add, review, change or clear. Referring briefly to FIG. 17A, there are shown three OSD's for the conditions when some timers are used, no timers are used, and when all timers are used. When all timers are used, one cannot add a program timer as shown by OSD 15c.

According to OSD 16 represented by bubble 1602, for example, eight program timers are available. Referring to FIG. 17B, there are shown OSD's 16a and 16b for situations when there is more than one remaining timer and there is only one remaining timer respectively. In either situation the cursor arrow icon is placed on a free timer and is selected. Referring again to FIG. 16A, then, bubble 1603 for OSD 17 is entered which presents choices single, weekly, everyday, or Mon–Fri. OSD 17 is also shown in FIG. 17B.

If Single or Weekly according to FIG. 16A is selected, then referring to FIG. 17C, then bubble 1604 is entered and one of OSD's 18 is shown. If everyday or Mon–Fri is selected, then bubble 1605 is entered and one of the OSD's 18 of FIG. 17C is shown entered via OSD 19 bubble 1605. On-screen display OSD 19 is shown in the top portion of FIG. 17D.

Referring to FIG. 16B, there is shown the sub-menu structure for setting the timers represented by OSD's 20, 21, 22, 23, 24, and 25. From bubble 1605 of FIG. 16A, control is transferred to bubble 1610 of FIG. 16B repesenting on-screen display OSD 20. OSD 20 is shown in the bottom portion of FIG. 17D. Through sensing of respective actuations of the SELECT key, bubbles 1611 for OSD 21, 1612 for OSD 22 and bubble 1613 for OSD 23 are entered. OSD's 21 and 22 are shown in FIG. 17E. Three versions of OSD 23 are shown in FIG. 17F, If after bubble 1613 for OSD 23a there is no parental control (pc), then OSD 26 or 34 is displayed per bubble 1614. If, on the other hand, there is parental control, the bubble 1615 is entered and OSD 24 displayed. After a correct five digit parental guidance code is entered via actuation of the digit keys, and the code is wrong, then, bubble 1616 is entered and OSD 25 displayed. OSD's 24 and 25 are shown in FIG. 17G. OSD 26 of FIG. 17G, like OSD 34 of FIG. 13B, is entered according to FIG. 16B, from either OSD 23 or OSD 24 bubbles 1613 or 1615.

Referring again to FIG. 16A, OSD's 27, 28, 29 and 30 are entered from choices made from OSD 15 bubble 1601. OSD 27, the review choice, represented by bubble 1609 and OSD28 of bubble 1606, entered from OSD 27 bubble 1609, are shown in FIG. 17H. Two versions of OSD 29, for the change choice bubble 1607, are shown in FIG. 17I. OSD 30 for the clear choice, represented by bubble 1608 is shown in FIG. 17J.

Figure 18:
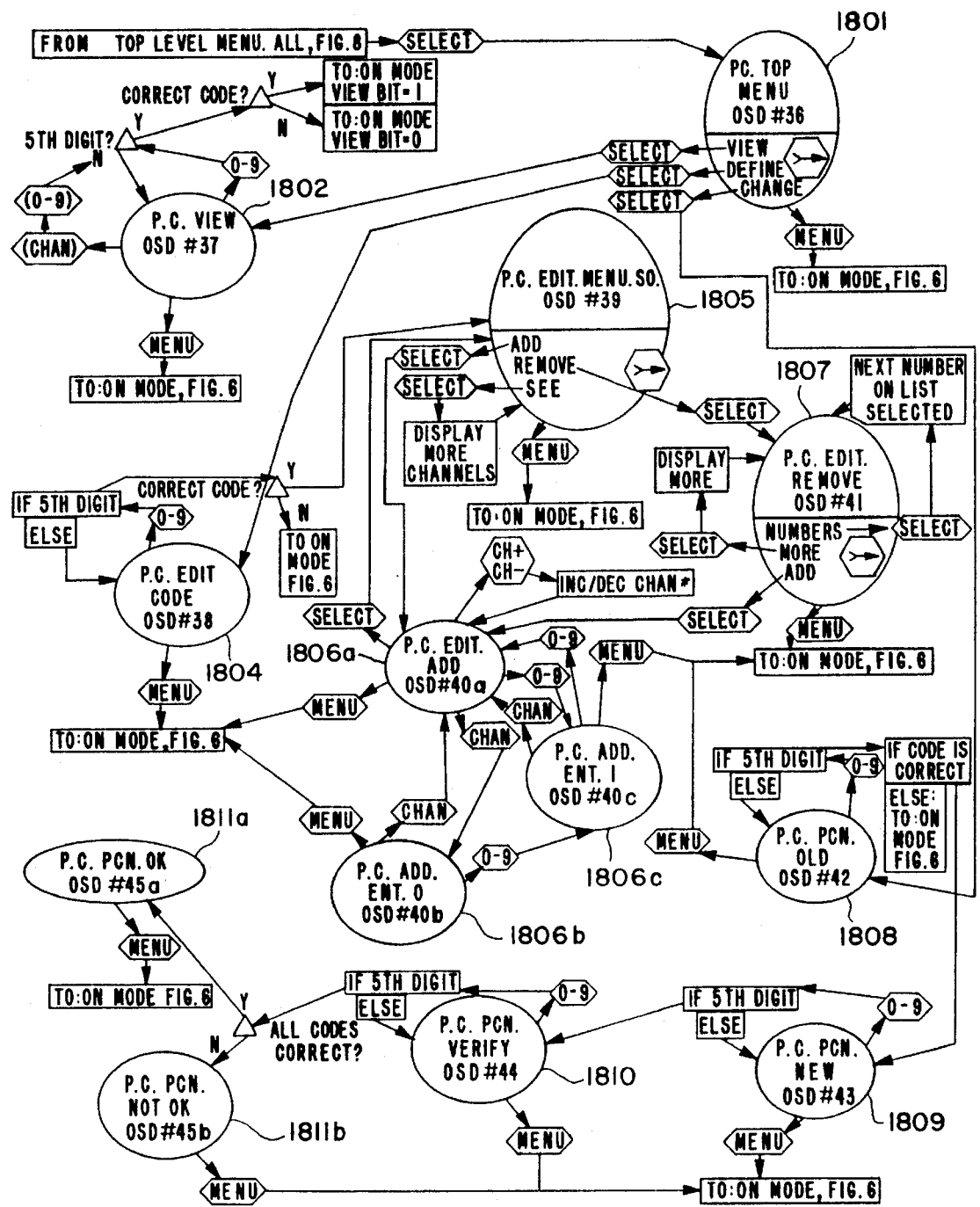
FIG. 18 is a state diagram for the parental control sub-menu structure of the main menu of FIG. 7.

Referring now to FIG. 18, there is shown a state diagram for the parental control choice of the main menu of FIG. 7. For using parental control, a first five digit parental control code is obtained in a secure manner from the headend by the user and downloaded for storage in terminal 300 according to the present invention. The first screen entered is OSD 36, represented by bubble 1801, which provides three choices, view parental channels, define parentally controlled channels, or change a parental control number code. OSD 36 is shown in FIG. 19A. If view is selected, then, bubble 1802 is entered and OSD 37 is displayed as per FIG. 19A. If change is selected, then, bubble 1809 is entered and OSD 43 displayed per FIG. 19E for entering a new code number. The define choice from bubble 1801 causes entry into bubble 1804. OSD 38a displayed at bubble 1804 requires entry of a parental control code. If the five digit code is correct, according to FIG. 18, then, bubble 1805 representing OSD 39 is entered as per FIG. 19B. Three choices are provided per OSD 39, see, add, or remove a channel from parental control. Per OSD 39a, the see more channels choice causes a cycling through more controlled channels.

According to FIG. 18, bubbles 1806 for three OSD's 40 are entered from bubble 1805 for OSD 39 when the add choice is selected. Three versions of OSD 40 are shown in FIG. 19C. The current channel tuned is a starting point for adding a channel per OSD 40a. If this is the first parentally controlled channel, blinking dashes are caused to appear per OSD 40b. Direct access through digit keys of remote control key pad 401 is represented by OSD 40c.

According to FIG. 18, bubble 1807 representing OSD 41 is entered from bubble 1805 for OSD 39 when the remove choice is selected. Three versions of OSD 41 are shown in FIG. 19D. From the remove choice bubble 1807 for OSD 41, the add bubble for OSD 40 may be reentered by selecting add a channel when there is room in terminal memory.

Bubbles 1808, 1809, 1810, 1810, 1811a and 1811b representing OSD's 42, 43, 44, and 45a and 45b are entered in sequence from OSD 36 when the change choice is selected and the five digit parental codes entered are correct. In order to enter a new number, one must first enter the old parental code number first correctly. The user is asked to enter their new code number twice to be sure they know it. These OSD's are shown in FIG. 19E.

Now referring to FIG. 20, the set top (terminal) control submenu structure will be described. Bubble 1004 causes display of OSD 46 when the set-top control choice is selected from main menu OSD 8a of FIG. 7A. Referring to FIG. 20A, OSD 46 provides three choices to the user, on-screen display, power outlet, and diagnostics (set top status). If OSD for on-screen display is selected at bubble 1004, then bubble 1005 is entered. Referring again to FIG. 20A, screens OSD 47 or 48 are toggled between enablement and disablement of on-screen display with the Select key. On-screen display can be annoying to a user, especially during his recording of a program event or movie. This feature of being able to allow disablement of on-screen display is thus a desirable feature to many users, OSD's 46, 47, and 48 are shown in FIG. 20A.

Also shown in FIG. 20A are OSD's 49 and 50 for changing the state of the power outlet provided on the rear of the terminal of FIG. 3 from always on to switched. Referring to FIG. 10, bubble 1006 represents the toggling of the AC outlet provided at the rear of terminal 300 for powering associated appliances such as television set 308. The feature is required for sleep timing, wake-up, and other services involving the turning on or off of an associated appliance.

If Set-Top Status is selected on OSD 46 of FIG. 20A, then, according to FIG. 10, bubble 1007 is entered and OSD 52 is displayed. Two different versions of OSD 52 are shown in FIG. 20B. Further diagnostics may be entered upon actuation and sensing of special key codes not available to a user, for example, for accomplishing a memory dump. These special key codes may only be transmitted by a secured remote control, for example, of a cable television repair person.

Thus, there has been shown and described a method and apparatus for providing a user friendly interface to a subscription television terminal which accomplishes the objects of the present invention, the present invention only limited by the scope of the claims which follow.

We claim:

1. An apparatus for controlling a cable television converter, the apparatus comprising:
   (a) a remote control comprising
      (i) a keypad having keys for indicating a menu initiation condition, a cursor movement condition, and a menu choice selection condition;
      (ii) command generating means, responsive to the keypad, for generating and transmitting a menu initiation command, a cursor movement command, and a menu choice selection command, each command corresponding to one of the indicated conditions; and
   (b) a subscriber terminal, connectable to a television receiver and responsive to said remote control, comprising
      (i) a receiver fork receiving said commands transmitted from said remote control;
      (ii) an on-screen display control for displaying, on said television receiver, a first menu having a first list of choices, a second menu having a second list of choices, a third menu having a third list of choices, and a choice indicator for highlighting one of the choices in each list of choices; and
      (iii) a processor, coupled to said receiver and responsive to said received commands, comprising
         first menu generation means for generating and directing said on-screen display control circuit to display, in response to the menu initiation command, the first menu;
         choice highlighting means for directing said on-screen display control circuit to highlight, in response to successively received cursor movement commands, successive ones of the choices in the first list;
         menu selection determination means for determining, in response to the menu choice selection command, which one of the choices in the first list is highlighted; and
         second menu generation means for generating and directing said on-screen display control circuit to display, in response to the menu selection determination means, the second menu when the highlighted choice is determined to be a first value, or the third menu when the highlighted choice is determined to be a second value, wherein the first list of choices comprises a favorite channel selection choice and the second menu comprises a favorite channel menu.

2. The apparatus of claim 1, wherein the first list of choices further comprises a parental control choice and the third menu comprises a parental control menu.

3. The apparatus of claim 2, wherein the third menu comprises choices for viewing parentally controlled channels, changing parentally controlled channels, and changing a parental control number.

4. The apparatus of claim 2, wherein the second menu comprises a list of currently favorite channels and choices for adding a favorite channel, removing a favorite channel, and clearing all favorite channels.

5. The apparatus of claim 1, wherein the first menu further comprises choices for initiating a pay-per-view event and setting a sleep timer, the third menu comprises a pay-per-view event menu, and a fourth menu comprises a sleep timer menu.

6. The apparatus of claim 5, wherein the third menu comprises choices for reviewing currently authorized pay-per-view events and setting a program timer for a pay-per-view event.

7. The apparatus of claim 5, wherein the fourth menu comprises choices for adding a program timer, changing a program timer, and clearing a program timer.

8. The apparatus of claim 1, wherein the keypad (a)(i) further comprises a key for indicating a time/channel display condition.

9. The apparatus of claim 8, wherein the command generating means (a)(ii) further generates and transmits, in response to the time/channel display condition, a command corresponding to the time/channel display condition.

10. The apparatus of claim 9, wherein the processor (b)(iii) further comprises time/channel generation means for generating and directing said on-screen display control circuit to display, in response to the time/channel display command, a current time and a current channel number.

11. A method of selecting and confirming a purchase from a cable television terminal using a remote control, the cable television terminal being connectable to a television receiver, the method comprising the steps of:

generating from the cable television terminal, in response to a first key press from the remote control, a first on screen display on the television receiver comprising a first menu having a first plurality of choices including a choice for making a purchase, generating from the cable television terminal, in response to successive second key presses from the remote control, a movable cursor for highlighting successive ones of the first plurality of choices, generating from the cable television terminal, in response to a third key press from the remote control, a second on screen display on the television receiver comprising a second menu comprising a second plurality of choices affecting the purchase, wherein the second plurality of choices includes choices for displaying previously arranged purchases and setting a program timer for a start of at least one of said previously arranged purchases.

12. The method of claim 11, further comprising a step of entering an access code into the cable television terminal to authorize a purchase.

13. A method of selecting and confirming a purchase from a cable television terminal, the cable television terminal being connectable to a television receiver and being coupled to a remote control having a keypad, the method comprising the steps of:

generating from the cable television terminal, in response to the cable television terminal being tuned to a predetermined channel, a first on screen display on the television receiver, the first on screen display having instructions for initiating a purchase associated with the predetermined channel, generating from the cable television terminal, in response to a first key press from the remote control keypad, a second on screen display on the television receiver, the second on screen display having instructions for entering an access code associated with the purchase, entering, from the remote control keypad, the access code and receiving the access code at the cable television terminal, verifying at the cable television terminal that the access code is valid, and generating, in response to a second key press from the remote control keypad and a valid verification of the access code, a third on screen display on the television receiver confirming the purchase.

14. The method of claim 13, wherein the first and second key presses correspond to a "BUY" key on the remote control.

15. The method of claim 13, wherein the predetermined channel is a pay-per-view channel.

16. The method of claim 15, wherein the first on screen display overlays a video signal corresponding to the predetermined channel for a predetermined period of time, after which the first on screen display is displayed without the video signal.

17. The method of claim 13, wherein the predetermined channel provides information for purchasing goods from a home.

18. The method of claim 13, wherein the predetermined channel provides information for purchasing airline tickets.

* * * * *

UNITED STATES PATENT AND TRADEMARK OFFICE
CERTIFICATE OF CORRECTION

PATENT NO. : 5,477,262
DATED : December 19, 1995
INVENTOR(S) : Robert O. Banker et al.

It is certified that error appears in the above-indentified patent and that said Letters Patent is hereby corrected as shown below:

On the title page, item [73]:
Change "Scientific-Altanta, Inc." to --Scientific-Atlanta, Inc.--.

Signed and Sealed this

Thirty-first Day of December, 1996

Attest:

BRUCE LEHMAN

Attesting Officer     Commissioner of Patents and Trademarks